(12) United States Patent
Thorne

(10) Patent No.: US 8,193,650 B2
(45) Date of Patent: Jun. 5, 2012

(54) POWER GENERATION SYSTEM FOR A STROLLER

(75) Inventor: Henry F. Thorne, West View, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 323 days.

(21) Appl. No.: 12/554,582

(22) Filed: Sep. 4, 2009

(65) Prior Publication Data

US 2010/0045146 A1    Feb. 25, 2010

Related U.S. Application Data

(63) Continuation-in-part of application No. 12/032,370, filed on Feb. 15, 2008.

(60) Provisional application No. 61/094,574, filed on Sep. 5, 2008, provisional application No. 60/890,597, filed on Feb. 19, 2007, provisional application No. 60/890,601, filed on Feb. 19, 2007, provisional application No. 60/890,605, filed on Feb. 19, 2007, provisional application No. 60/890,607, filed on Feb. 19, 2007, provisional application No. 60/890,608, filed on Feb. 19, 2007, provisional application No. 60/890,613, filed on Feb. 19, 2007, provisional application No. 60/890,616, filed on Feb. 19, 2007, provisional application No. 60/890,618, filed on Feb. 19, 2007, provisional application No. 60/890,619, filed on Feb. 19, 2007, provisional application No. 60/890,624, filed on Feb. 20, 2007.

(51) Int. Cl.
*B62B 7/00* (2006.01)

(52) U.S. Cl. ...................................... 290/1 R
(58) Field of Classification Search ........... 290/1 R
See application file for complete search history.

(56) References Cited

U.S. PATENT DOCUMENTS

| | | |
|---|---|---|
| 2,616,719 A | 11/1952 | Heideman |
| 2,669,460 A | 2/1954 | Wallner |
| 2,783,053 A | 2/1957 | Sheldrick et al. |
| 2,914,111 A | 11/1959 | Mize |
| 3,112,042 A | 11/1963 | Leshner |
| 3,168,330 A | 2/1965 | Smith et al. |
| 3,459,435 A | 8/1969 | Garner |
| 3,504,926 A | 4/1970 | Glaser |
| 3,556,546 A | 1/1971 | Garner |
| 3,961,803 A | 6/1976 | Fleischer |
| 4,023,825 A | 5/1977 | Kassai |
| 4,046,401 A | 9/1977 | Kassai |
| 4,111,454 A | 9/1978 | Kassai |

(Continued)

FOREIGN PATENT DOCUMENTS

CN    201023514 Y    2/2008

(Continued)

*Primary Examiner* — Joseph Waks

(57) ABSTRACT

A system for generating electrical energy from the movement of the stroller includes: a wheel; a gear reduction system operationally coupled between the wheel and a motor such that rotation of the wheel causes the motor to generate electrical energy; a power storage device operationally coupled to the motor for storing the electrical energy produced by the motor; and a control system. The control system includes: a switching device operationally coupled between the motor and the power storage device; and a microcontroller operationally coupled to the switching device and configured to control the state of the switching device. The microcontroller controls the switching device to close to allow the electrical energy generated by the motor to flow into and charge the power storage device, and the microcontroller controls the switching device to open to prevent the electrical energy from flowing to the power storage device.

10 Claims, 29 Drawing Sheets

U.S. PATENT DOCUMENTS

| | | | |
|---|---|---|---|
| 4,126,331 A | 11/1978 | Sloan et al. | |
| 4,191,397 A | 3/1980 | Kassai | |
| 4,232,897 A | 11/1980 | Maclaren et al. | |
| 4,248,443 A | 2/1981 | Ohlson | |
| 4,317,581 A | 3/1982 | Kassai | |
| 4,335,900 A | 6/1982 | Fleischer | |
| 4,362,315 A | 12/1982 | Kassai | |
| 4,384,240 A * | 5/1983 | Sloan | 318/255 |
| 4,412,688 A | 11/1983 | Giordani | |
| 4,415,180 A | 11/1983 | Payne, Jr. | |
| 4,527,665 A | 7/1985 | Shamie | |
| 4,542,915 A | 9/1985 | Wheeler, III et al. | |
| 4,564,212 A | 1/1986 | Orlandino et al. | |
| 4,567,964 A | 2/1986 | Kassai | |
| 4,606,550 A | 8/1986 | Cone | |
| 4,610,460 A | 9/1986 | Kassai | |
| 4,618,033 A | 10/1986 | Kassai | |
| 4,620,711 A | 11/1986 | Dick | |
| 4,632,420 A | 12/1986 | Miyagi | |
| 4,632,421 A | 12/1986 | Shamie | |
| 4,660,850 A | 4/1987 | Nakao et al. | |
| 4,706,986 A | 11/1987 | Kassai | |
| 4,741,056 A | 5/1988 | Kassai | |
| 4,741,551 A | 5/1988 | Perego | |
| 4,763,911 A | 8/1988 | Gebhard et al. | |
| 4,763,919 A | 8/1988 | Nakao et al. | |
| 4,768,795 A | 9/1988 | Mar | |
| 4,770,437 A | 9/1988 | Glaser | |
| 4,817,982 A | 4/1989 | Kassai | |
| 4,819,958 A | 4/1989 | Perego | |
| 4,831,689 A | 5/1989 | Lo | |
| 4,832,361 A | 5/1989 | Nakao et al. | |
| 4,856,809 A | 8/1989 | Kohus et al. | |
| 4,886,289 A | 12/1989 | Yee et al. | |
| 4,892,327 A | 1/1990 | Cabagnero | |
| 4,907,818 A | 3/1990 | Chai | |
| 4,913,452 A | 4/1990 | Zun | |
| 4,924,725 A | 5/1990 | Takahashi et al. | |
| 4,930,697 A | 6/1990 | Takahashi et al. | |
| 4,953,667 A | 9/1990 | Bigo | |
| 4,953,887 A | 9/1990 | Takahashi et al. | |
| 4,985,960 A | 1/1991 | Zun | |
| 4,997,066 A | 3/1991 | Bigo | |
| 5,056,805 A | 10/1991 | Wang | |
| 5,074,575 A | 12/1991 | Bigo | |
| 5,087,066 A | 2/1992 | Mong-Hsing | |
| 5,110,150 A | 5/1992 | Chen | |
| 5,143,398 A | 9/1992 | Teng | |
| 5,181,735 A | 1/1993 | Onishi | |
| 5,184,835 A | 2/1993 | Huang | |
| 5,188,389 A | 2/1993 | Baechler et al. | |
| 5,201,535 A | 4/1993 | Kato et al. | |
| 5,203,577 A | 4/1993 | Kato et al. | |
| 5,205,577 A | 4/1993 | Liu | |
| 5,244,228 A | 9/1993 | Chiu | |
| 5,246,272 A | 9/1993 | Kato et al. | |
| 5,257,799 A | 11/1993 | Cone et al. | |
| 5,362,089 A | 11/1994 | Jyan-Tsai | |
| 5,373,917 A | 12/1994 | Kamman | |
| 5,388,852 A | 2/1995 | Bigo et al. | |
| 5,417,450 A | 5/1995 | Wang | |
| 5,427,402 A | 6/1995 | Huang | |
| 5,454,584 A | 10/1995 | Haut et al. | |
| 5,460,398 A | 10/1995 | Huang | |
| 5,460,399 A | 10/1995 | Baechler et al. | |
| 5,472,224 A | 12/1995 | Jane Cabagnero | |
| 5,478,102 A | 12/1995 | Haung | |
| 5,490,685 A | 2/1996 | Kitayama et al. | |
| 5,511,441 A | 4/1996 | Arai | |
| 5,513,864 A | 5/1996 | Huang | |
| 5,522,614 A | 6/1996 | Eyman et al. | |
| 5,524,503 A | 6/1996 | Ishikura | |
| 5,584,561 A | 12/1996 | Lahos | |
| 5,590,896 A | 1/1997 | Eichhorn | |
| 5,605,409 A | 2/1997 | Haut et al. | |
| 5,622,377 A | 4/1997 | Shamie | |
| 5,645,293 A | 7/1997 | Cheng | |
| 5,664,795 A | 9/1997 | Haung | |
| 5,669,623 A | 9/1997 | Onishi | |
| 5,676,386 A | 10/1997 | Huang | |
| 5,718,444 A | 2/1998 | Huang | |
| 5,722,682 A | 3/1998 | Wang | |
| 5,727,798 A | 3/1998 | Walters et al. | |
| 5,738,410 A | 4/1998 | Stroud et al. | |
| 5,746,282 A * | 5/1998 | Fujiwara et al. | 180/6.2 |
| 5,765,665 A | 6/1998 | Cheng et al. | |
| 5,765,855 A | 6/1998 | Chiu | |
| 5,765,856 A | 6/1998 | Kiser | |
| 5,769,447 A | 6/1998 | Huang | |
| 5,772,279 A | 6/1998 | Johnson, Jr. | |
| 5,775,718 A | 7/1998 | Huang | |
| 5,795,091 A | 8/1998 | Kakuda et al. | |
| 5,845,666 A | 12/1998 | Messner | |
| 5,845,924 A | 12/1998 | Huang | |
| 5,865,447 A | 2/1999 | Huang | |
| 5,876,046 A | 3/1999 | Courtney et al. | |
| 5,876,057 A | 3/1999 | Huang | |
| 5,882,030 A | 3/1999 | Haut | |
| 5,887,935 A | 3/1999 | Sack | |
| 5,911,478 A | 6/1999 | Goodman | |
| 5,938,229 A | 8/1999 | Chen et al. | |
| 5,947,555 A | 9/1999 | Welsh, Jr. et al. | |
| 5,967,535 A | 10/1999 | King | |
| 5,979,928 A | 11/1999 | Kuo | |
| 5,988,669 A | 11/1999 | Freese et al. | |
| 6,022,042 A | 2/2000 | Hartenstine | |
| 6,070,890 A | 6/2000 | Haut et al. | |
| 6,095,548 A | 8/2000 | Baechler | |
| 6,102,167 A | 8/2000 | Chiu | |
| 6,105,998 A | 8/2000 | Baechler et al. | |
| 6,116,624 A | 9/2000 | Hu | |
| 6,139,046 A | 10/2000 | Aalund et al. | |
| 6,155,628 A | 12/2000 | Williams | |
| 6,155,740 A | 12/2000 | Hartenstine | |
| 6,170,615 B1 | 1/2001 | Cheng | |
| 6,203,054 B1 | 3/2001 | Matsumoto | |
| 6,242,889 B1 * | 6/2001 | Belyo | 320/128 |
| 6,273,451 B1 | 8/2001 | Julien et al. | |
| 6,286,844 B1 | 9/2001 | Cone, II et al. | |
| 6,298,949 B1 | 10/2001 | Yang et al. | |
| 6,308,805 B1 | 10/2001 | Lan | |
| 6,331,032 B1 | 12/2001 | Haut et al. | |
| 6,341,672 B1 | 1/2002 | Yang et al. | |
| 6,368,006 B1 | 4/2002 | Yang et al. | |
| 6,394,633 B1 | 5/2002 | Perez | |
| 6,408,990 B1 | 6/2002 | Chen | |
| 6,409,205 B1 | 6/2002 | Bapst et al. | |
| 6,446,990 B1 | 9/2002 | Nania et al. | |
| 6,478,327 B1 | 11/2002 | Hartenstine et al. | |
| 6,499,749 B2 | 12/2002 | Hsia | |
| 6,502,656 B2 * | 1/2003 | Weiss et al. | 180/168 |
| 6,560,827 B1 | 5/2003 | Gross | |
| 6,598,712 B1 | 7/2003 | Sun | |
| 6,659,208 B2 * | 12/2003 | Gaffney et al. | 180/19.2 |
| 6,663,121 B2 | 12/2003 | Santos et al. | |
| 6,676,140 B1 | 1/2004 | Gondobintoro | |
| 6,722,690 B2 | 4/2004 | Lan | |
| 6,725,713 B2 | 4/2004 | Adamson et al. | |
| 6,742,791 B2 | 6/2004 | Lan | |
| 6,807,853 B2 | 10/2004 | Adamson et al. | |
| 6,916,249 B2 * | 7/2005 | Meade | 472/119 |
| 6,926,287 B1 | 8/2005 | Maher | |
| D510,716 S | 10/2005 | Refsum et al. | |
| 6,991,248 B2 | 1/2006 | Valdez et al. | |
| 7,059,452 B2 | 6/2006 | Chen | |
| 7,077,420 B1 | 7/2006 | Santoski | |
| D526,601 S | 8/2006 | Oxseth | |
| 7,086,491 B2 * | 8/2006 | Matte | 180/65.1 |
| 7,108,275 B2 | 9/2006 | Yeh et al. | |
| 7,125,081 B2 | 10/2006 | Church et al. | |
| 7,128,076 B2 | 10/2006 | Freedman | |
| 7,175,004 B2 | 2/2007 | Kassai et al. | |
| 7,219,918 B2 | 5/2007 | Lan | |
| 7,222,874 B1 | 5/2007 | Liu | |
| 7,229,091 B2 | 6/2007 | Lan | |
| 7,237,821 B2 * | 7/2007 | Choi | 296/97.1 |
| 7,350,607 B2 * | 4/2008 | Park et al. | 180/65.51 |

| | | |
|---|---|---|
| 7,367,432 B2 | 5/2008 | Chen |
| 7,383,925 B2 | 6/2008 | Chen |
| 7,445,228 B2 | 11/2008 | Henry |
| D583,719 S | 12/2008 | Siewertsen |
| 7,523,954 B2 | 4/2009 | Dotsey et al. |
| 7,571,926 B2 | 8/2009 | Huang |
| 7,591,479 B2 | 9/2009 | Golias |
| 7,658,247 B2 * | 2/2010 | Carter ................. 180/65.24 |
| 7,870,916 B2 * | 1/2011 | Carter ................. 180/65.24 |
| 2003/0025300 A1 | 2/2003 | Maxisch |
| 2003/0132612 A1 | 7/2003 | Pike et al. |
| 2004/0178025 A1 | 9/2004 | Zweideck |
| 2004/0222616 A1 | 11/2004 | Valdez et al. |
| 2005/0242548 A1 | 11/2005 | Hutchinson et al. |
| 2005/0248121 A1 | 11/2005 | Ford |
| 2006/0007191 A1 | 1/2006 | Chi et al. |
| 2006/0151259 A1 | 7/2006 | Tomasi et al. |
| 2006/0158868 A1 | 7/2006 | Palmer et al. |
| 2006/0214395 A1 | 9/2006 | Ageneau |
| 2006/0214397 A1 | 9/2006 | Dotsey et al. |
| 2006/0249320 A1 * | 11/2006 | Carter et al. .................. 180/65.5 |
| 2006/0255566 A1 | 11/2006 | Dotsey et al. |
| 2006/0255567 A1 | 11/2006 | Dotsey et al. |
| 2006/0261576 A1 | 11/2006 | Dotsey et al. |
| 2007/0045055 A1 | 3/2007 | Lan |
| 2007/0051565 A1 | 3/2007 | Chen |
| 2007/0085304 A1 | 4/2007 | Yeh |
| 2007/0126208 A1 | 6/2007 | Freedman |
| 2007/0131465 A1 * | 6/2007 | Garceau ................. 180/65.5 |
| 2007/0222188 A1 | 9/2007 | Dean et al. |
| 2007/0246915 A1 | 10/2007 | Madigan et al. |
| 2007/0246916 A1 | 10/2007 | Hou |
| 2007/0257457 A1 | 11/2007 | Dotsey et al. |
| 2007/0262565 A1 | 11/2007 | Bearup et al. |
| 2008/0000732 A1 | 1/2008 | Chen et al. |
| 2008/0023234 A1 * | 1/2008 | Wang ..................... 180/14.2 |
| 2008/0041644 A1 * | 2/2008 | Tudek et al. .............. 180/65.1 |
| 2008/0073878 A1 | 3/2008 | Li |
| 2008/0078630 A1 | 4/2008 | Yeh |
| 2008/0084040 A1 * | 4/2008 | McGowan ................. 280/47.38 |
| 2008/0185236 A1 | 8/2008 | Chen et al. |
| 2008/0185821 A1 | 8/2008 | Chen et al. |
| 2008/0217115 A1 | 9/2008 | Chen |
| 2008/0224450 A1 | 9/2008 | Van der Vegt |
| 2008/0238042 A1 | 10/2008 | Chen et al. |
| 2009/0014985 A1 | 1/2009 | Huang |

FOREIGN PATENT DOCUMENTS

| | | |
|---|---|---|
| DE | 4328567 A1 | 3/1995 |
| DE | 102005063362 A1 | 4/2007 |
| EP | 0633178 A1 | 1/1995 |
| EP | 0719693 A2 | 7/1996 |
| EP | 1270365 A1 | 1/2003 |
| EP | 1366545 A1 | 8/2003 |
| EP | 1459957 A1 | 9/2004 |
| EP | 1488983 A2 | 12/2004 |
| EP | 1582434 A2 | 10/2005 |
| EP | 1688336 A2 | 8/2006 |
| FR | 2794413 A3 | 12/2000 |
| GB | 2283791 A | 5/1995 |
| GB | 2293420 A | 3/1996 |
| GB | 2297133 A | 7/1996 |
| GB | 2351131 A | 12/2000 |
| GB | 2418894 A | 4/2006 |
| GB | 2430719 A | 4/2007 |
| GB | 2431622 A | 5/2007 |
| GB | 2431624 A | 5/2007 |
| GB | 2437300 A | 10/2007 |
| GB | 2446729 A | 8/2008 |
| GB | 2446900 A | 8/2008 |
| GB | 2448059 A | 10/2008 |
| JP | 2005263086 A | 9/2005 |
| JP | 2008296902 A | 12/2008 |
| WO | 2008085531 A1 | 7/2008 |

* cited by examiner

POWER GENERATION SYSTEM FOR A STROLLER

CROSS REFERENCE TO RELATED APPLICATIONS

This application is based on U.S. Provisional Patent Application No. 61/094,574, filed Sep. 5, 2008, on which priority of this patent application is based and which is hereby incorporated by reference in its entirety. This application is also a continuation-in-part of U.S. patent application Ser. No. 12/032,370, filed Feb. 15, 2008, which claims the benefit of priority from U.S. Provisional Patent Application No. 60/890,597 filed Feb. 19, 2007; Ser. No. 60/890,601 filed Feb. 19, 2007; Ser. No. 60/890,605 filed Feb. 19, 2007; Ser. No. 60/890,607 filed Feb. 19, 2007; Ser. No. 60/890,608 filed Feb. 19, 2007; Ser. No. 60/890,613 filed Feb. 19, 2007; Ser. No. 60/890,616 filed Feb. 19, 2007; Ser. No. 60/890,618 filed Feb. 19, 2007; Ser. No. 60/890,619 filed Feb. 19, 2007; and Ser. No. 60/890,624, filed Feb. 20, 2007, all of which are incorporated herein by reference in their entirety.

BACKGROUND OF THE INVENTION

1. Field of the Invention

The present invention relates generally to strollers, and more particularly, pertains to baby strollers having one or more components which can be moved by a drive mechanism.

2. Description of Related Art

Baby strollers, also referred to as baby carriages, baby buggies, or prams, have been used to hold and transport babies and young children for many years. Early baby strollers had parts which were fixedly secured to one another such that they did not fold for compactness. More recently, baby strollers have been designed to have some parts which are movable relative to one another to allow movement of some parts of the stroller to achieve a more compact configuration when not in use. However, current strollers do not allow for movement or folding to compact configuration as desired, and are cumbersome and sometimes difficult to move between their collapsed (closed) positions and their operative (open) positions, particularly when attending to a baby or child. A stroller which is easier to move between its collapsed and operative positions, such as one that does so upon the push of a button via motorized movement, is desired.

SUMMARY OF THE INVENTION

One embodiment of the present invention is directed to a system for generating electrical energy from the movement of the stroller. The system includes: a wheel; a gear reduction system operationally coupled between the wheel and a motor such that rotation of the wheel causes the motor to generate electrical energy; a power storage device operationally coupled to the motor for storing the electrical energy produced by the motor; and a control system. The control system includes: a switching device operationally coupled between the motor and the power storage device; and a microcontroller operationally coupled to the switching device and configured to control the state of the switching device. The microcontroller controls the switching device to close to allow the electrical energy generated by the motor to flow into and charge the power storage device, and the microcontroller controls the switching device to open to prevent the electrical energy from flowing to the power storage device.

The microcontroller may control the switching device by pulsing the switching device open and closed at a predetermined rate and varies a duty cycle. The microcontroller may vary the duty cycle to either allow a greater proportion of the electrical energy generated by the motor to flow to the power storage device or prevent a greater proportion of the electrical energy generated by the motor to flow to the power storage device. The microcontroller may control the switching device to open to prevent additional electrical energy from flowing to the power storage device if the power storage device is fully charged. In addition, the microcontroller may be configured to vary the duty cycle to maximize the proportion of the electrical energy generated by the motor that flows to the power storage device when the stroller is being pushed downhill. The microcontroller may determine if the stroller is being pushed downhill based on feedback from an accelerometer, a gyroscope, a mercury switch, or any combination thereof.

The gear reduction system may include: a first gear operationally coupled to and driven by a wheel; a second gear driven by the first gear; a third gear driven by the second gear; and a fourth gear driven by the third gear. The fourth gear may be coupled to a drive shaft of a motor such that rotation of the fourth gear causes the motor to produce electrical energy. A rubber bushing may be provided to surround at least part of the motor for noise reduction.

The switching device may be a transistor and the power storage device may be a rechargeable nickel metal hydride battery.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

Figure 1:
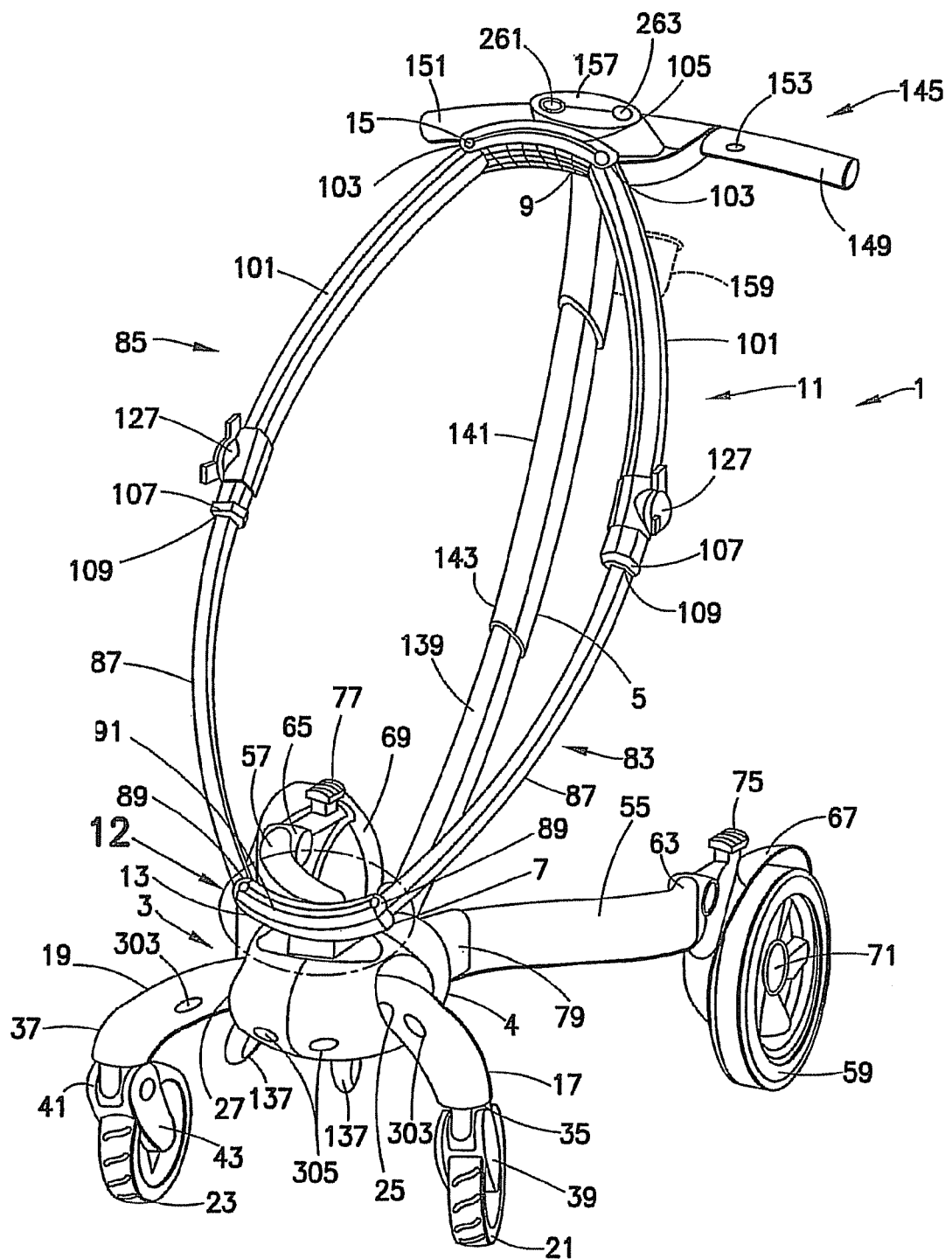
FIG. 1 is a perspective view of a collapsible stroller shown in its open position in accordance with one embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 7:
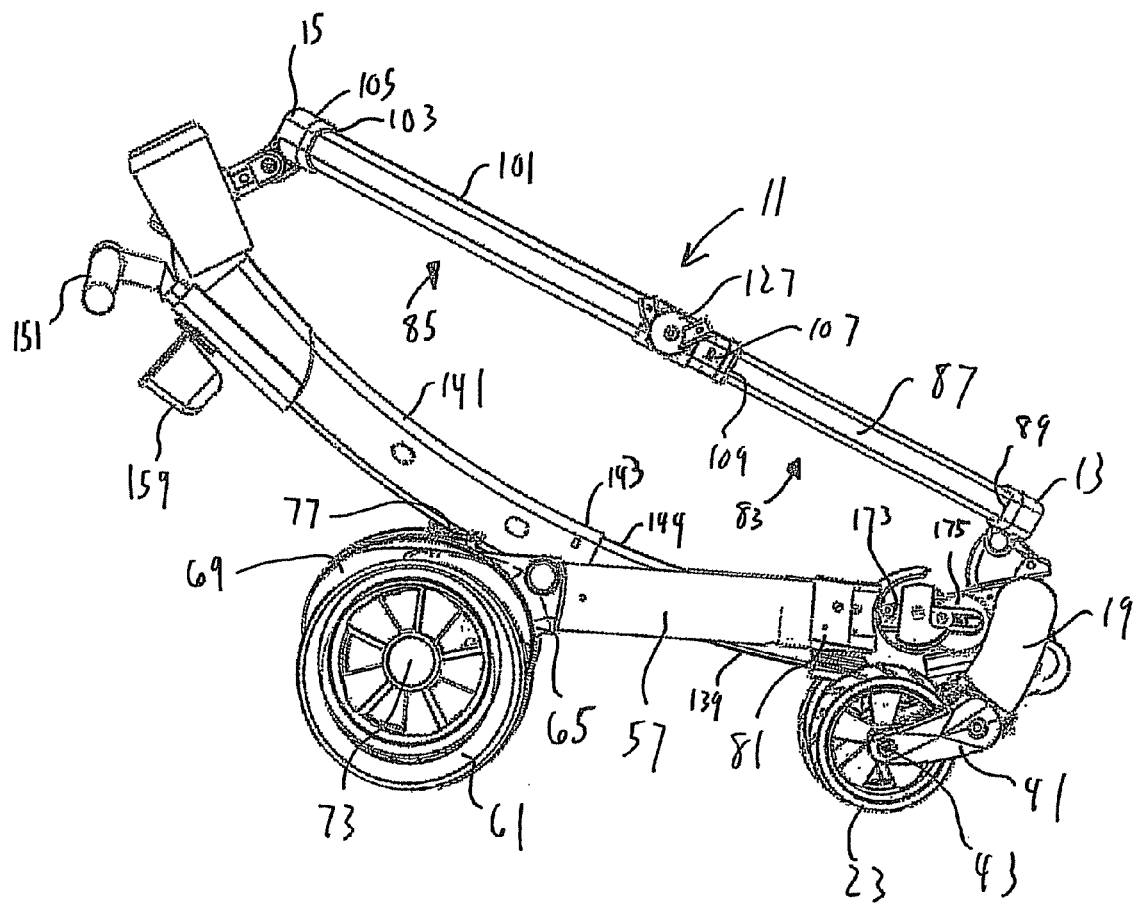
FIG. 7 is a side view of the stroller of FIG. 1 shown in its partially open position.
Figure 8:
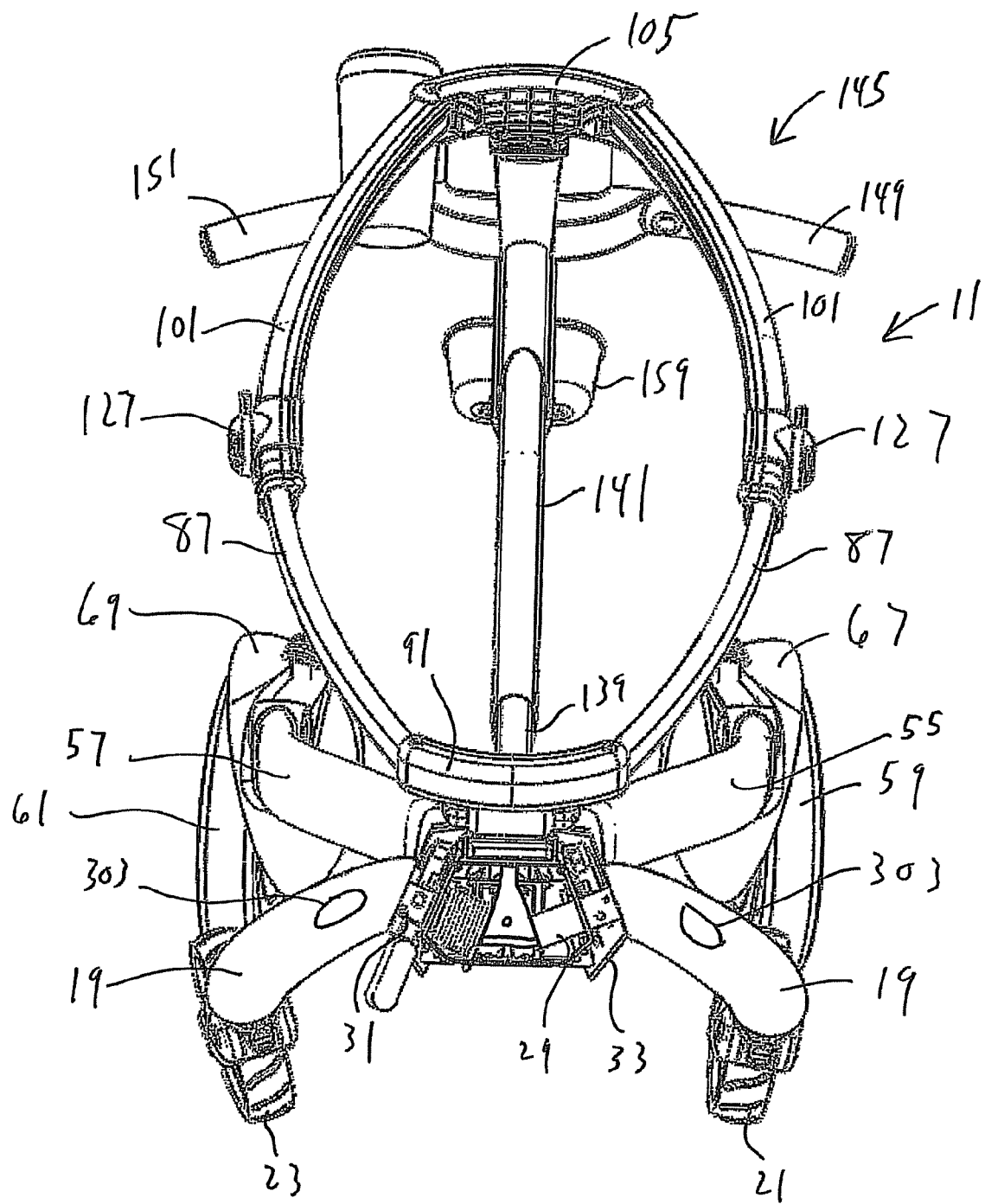
FIG. 8 is a front view of the stroller of FIG. 1 shown in its partially open position.
Figure 9:
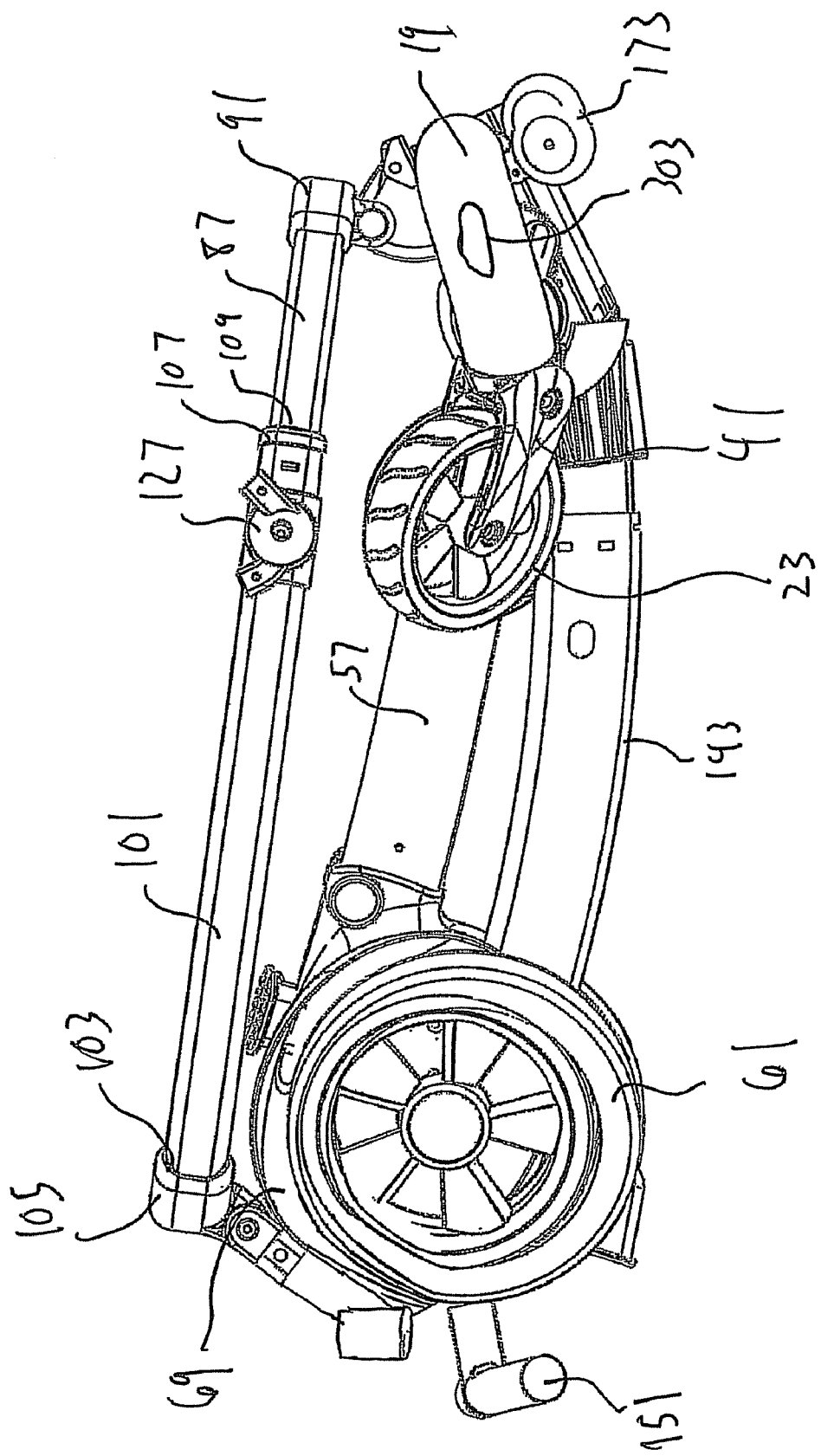
FIG. 9 is a side view of the stroller of FIG. 1 shown in its fully closed position.
Figure 10:
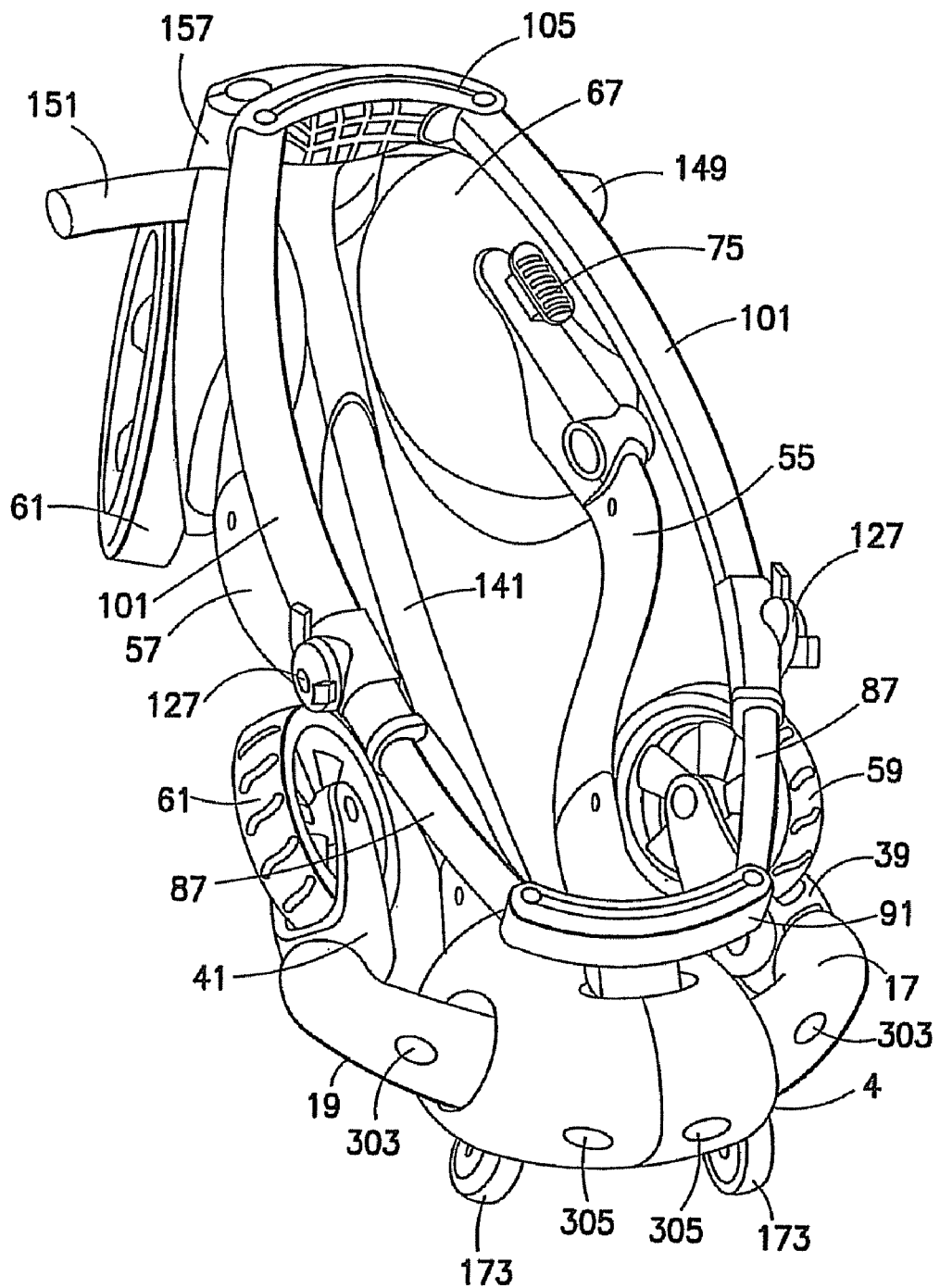
FIG. 10 is a front perspective view of the stroller of FIG. 1 shown in its fully closed position.

With reference to FIGS. 1-10, a stroller, denoted generally as reference numeral 1, includes a hub 3; a support structure 5 having a first end 7 coupled to hub 3 and a second end 9; a seating portion 11 having a bottom portion 13 coupled to a top portion of hub 3 and a top portion 15 coupled to second end 9 of support structure 5. Hub 3 includes a housing 33 (see FIG. 4) that is covered by a covering 4. Stroller 1 is configured to collapse in the length, width, and height directions for storage and transportation as shown in FIGS. 9-10 and expand in the length, width, and height directions for use as shown in FIGS. 1-6. An intermediate position between the collapsed position and the expanded position is shown in FIGS. 7-8.

Stroller 1 further includes a first front leg 17 rotationally coupled to hub 3 and a second front leg 19 rotationally coupled to hub 3. A first front wheel 21 is rotationally coupled to and supported by first front leg 17 and a second front wheel 23 is rotationally coupled to and supported by second front leg 19. A proximal end 25, 27 of each front leg 17, 19 includes a post 29, 31 that is rotatably engaged within housing 33 of hub 3. Posts 29, 31 are mechanically coupled as will be discussed in greater detail hereinafter, thereby enabling rotational movement of each front leg 17, 19 about housing 33 between an open position (see FIGS. 1-6) and a collapsed position (see FIGS. 9-10).

Figure 11:
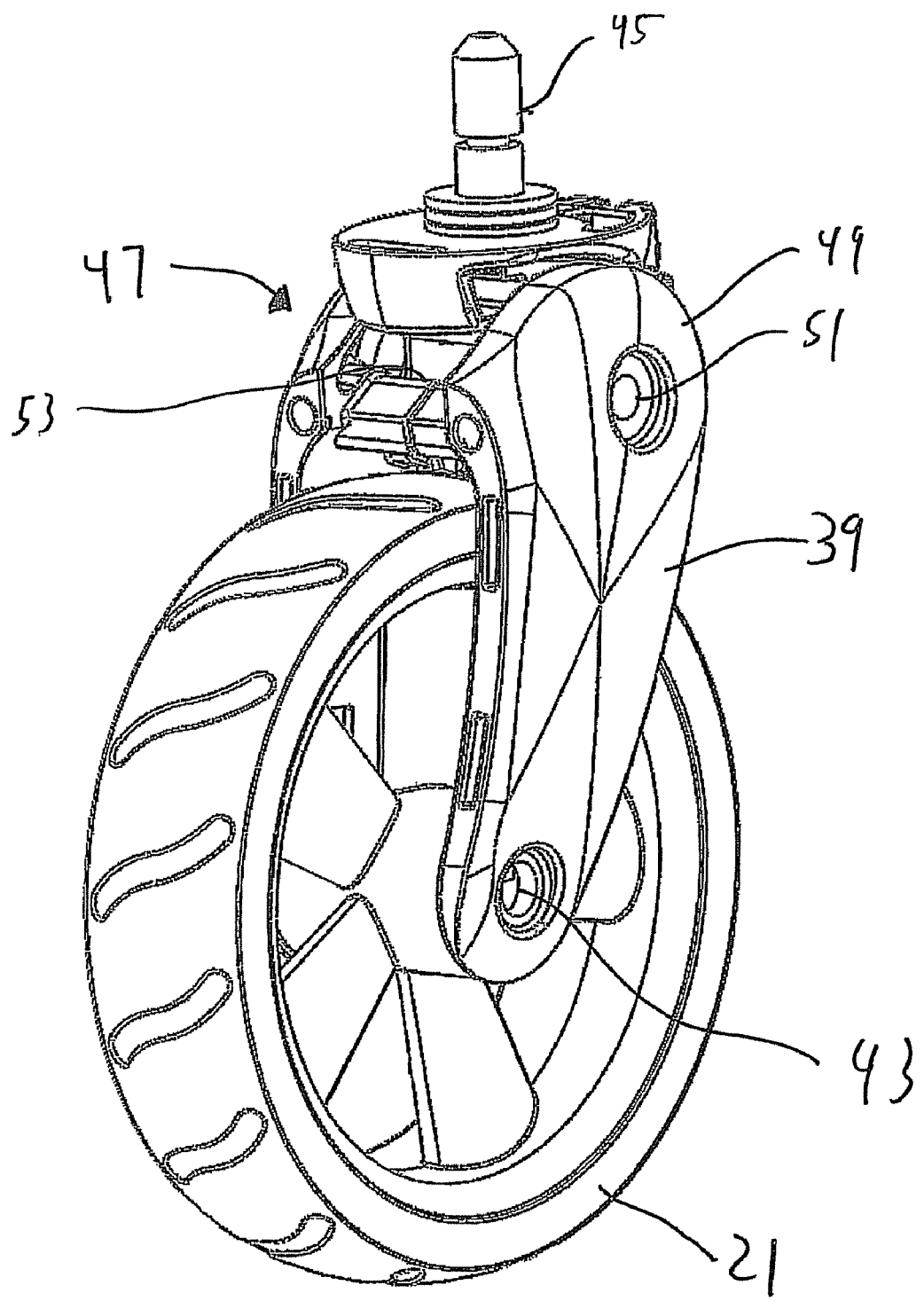
FIG. 11 is a perspective view of a suspension module of the stroller of FIG. 1.

With reference to FIG. 11 and with continued reference to FIGS. 1-10, pivotally connected to a distal end 35, 37 of each front leg 17, 19 is a pair of generally U-shaped wheel receiving members 39, 41 for receiving respective front wheels 21, 23. Each wheel receiving member 39, 41 comprises an axle 43 to allow the front wheels 21, 23 to roll about their respective axles 43. Wheel receiving members 39, 41 are pivotally connected via a post 45 or any other suitable fastening mechanism to the distal ends 35, 37 of front legs 17, 19 to allow the front wheels 21, 23 to pivot about respective axes substantially perpendicular to their axles 43 to accommodate changes in the rolling direction of the front of stroller 1.

A suspension module 47 may be disposed between each wheel receiving member 39, 41 and distal end 35, 37 of each front leg 17, 19. While any of a number of suspension mechanisms well-known to those skilled in the art may be used, such as compression springs or the like, the preferred suspension module 47 also ensures the wheel receiving members 39, 41 avoid being trapped or stuck when stroller 1 is automatically folded as described in greater detail hereinafter. To accomplish this, suspension module 47 is rotatably attached to an upper, front portion 49 of wheel receiving member 39, 41 by a pin 51. A torsion spring 53 is provided to bias suspension module 47 against wheel receiving member 39, 41 during normal operation. Pin 51 is placed in upper, front portion 49 of wheel receiving member 39, 41 so that normal use of the stroller will not cause suspension module 47 to pull away from wheel receiving member 39, 41. However, during automatic or manual folding of stroller 1, it is possible that front wheels 21, 23 could be oriented in an undesirable position whereby one or both of the front wheels 21, 23 are wedged against another part of stroller 1, blocking front legs 17, 19 from folding properly. To alleviate this possibility, suspension module 47 accommodates rotation about pin 51 of up to approximately 80 degrees in order to provide sufficient clearance for front legs 17, 19 to fold properly.

With continued reference to FIGS. 1-10, stroller 1 further includes a first rear leg 55 and a second rear leg 57. First rear leg 55 and second rear leg 57 are rotationally coupled to hub 3. In addition, first rear leg 55 and second rear leg 57 are mechanically coupled to each other and to first front leg 17 and second front leg 19 as will be described in greater detail hereinafter. Each rear leg 55, 57 has a long cross-sectional dimension and a short cross-sectional dimension. In addition, each rear leg 55, 57 is configured to rotationally support a rear wheel 59, 61 at a distal end 63, 65 thereof within a respective rear wheel housing 67, 69. More specifically, the respective axles 71, 73 of rear wheels 59, 61 are received in the respective rear wheel housings 67, 69 to allow the rear wheels 59, 61 to roll about their respective axles 71, 73. Each rear wheel housing 67, 69 houses a braking mechanism, operated by either or both of brake pedals 75, 77 for selectively locking rear wheels 59, 61 to prevent inadvertent rolling movement of stroller 1 when the braking mechanism is locked. The braking mechanism will be discussed in greater detail hereinafter with reference to FIGS. 23A-23C. In addition, each rear wheel housing 67, 69 also houses a power generating device operationally coupled to the respective axle 71, 73 of rear wheels 59, 61. The power generating device is provided to recharge an onboard power supply, which provides power to an actuation device that allows the stroller to collapse and expand automatically. The power supply also provides power to additional accessories and onboard systems. The power generating device will be discussed in greater detail hereinafter with reference to FIGS. 24-27.

A proximal end 79, 81 of each rear leg 55, 57 is rotationally coupled to hub 3 for enabling rotational movement of the rear legs 55, 57 such that the rear legs 55, 57 are movable between an open position (see FIGS. 1-6) and a collapsed position (see FIGS. 9-10). Rear legs 55, 57, in cross-section, have a long dimension and a short dimension. A plane bisecting the long dimension of a portion of rear legs 55, 57 near distal ends 63, 65 thereof is canted in the range of 12 to 25 degrees, preferably 19 degrees, in relation to a plane bisecting the long dimension of a portion of rear legs 55, 57 near proximal ends 79, 81. This cant results in a narrower footprint when rear legs 55, 57 are in their collapsed position than when they are in their open position. By way of further illustration, as rear legs 55, 57 are collapsed, the rear wheels 59, 61 move closer to each other to provide a more compact folded stroller 1 as illustrated in FIGS. 7-10.

Figure 12:
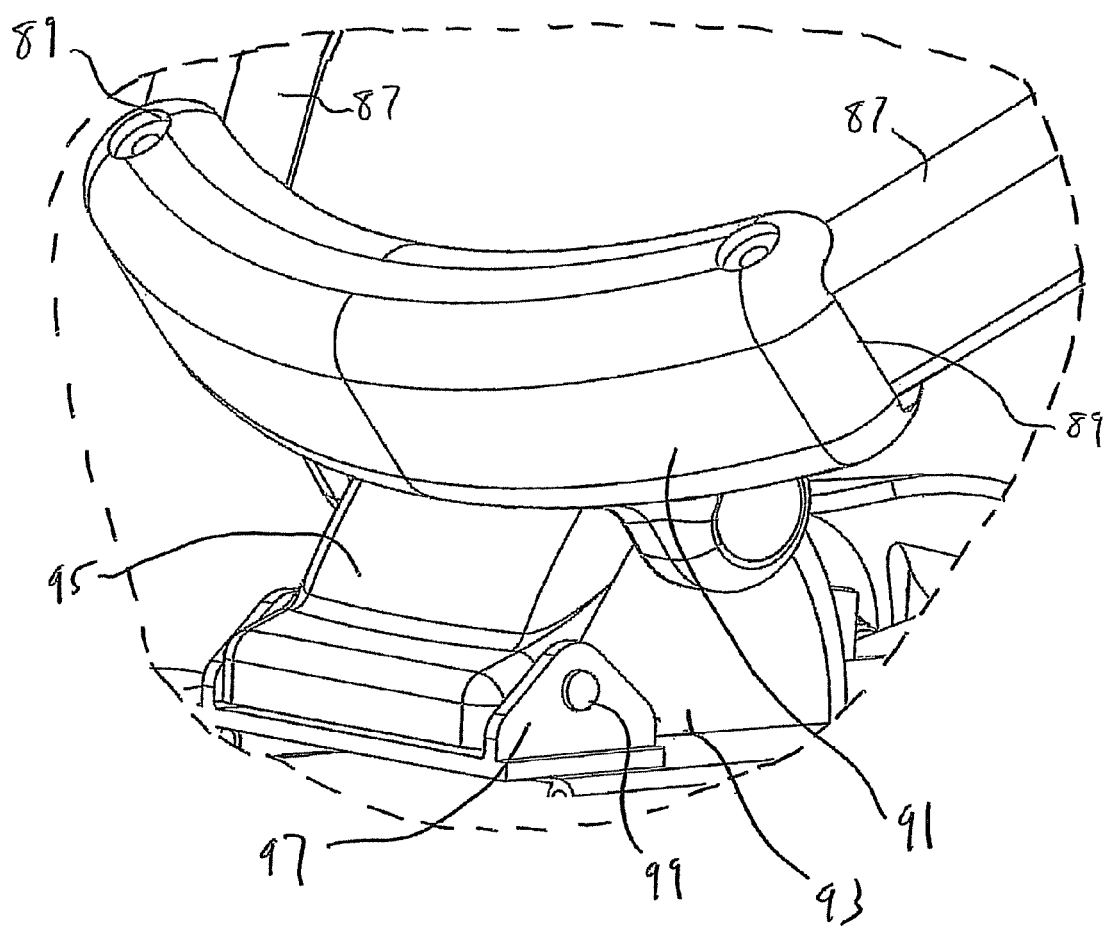
FIG. 12 is a portion of FIG. 1 illustrating a seat frame mounting member enlarged for magnification purposes.

Referring now to seating portion 11 of stroller 1 of the present invention, seating portion 11 includes a generally U-shaped lower seat frame assembly 83 and a generally U-shaped upper seat frame assembly 85. Lower seat frame assembly 83 and upper seat frame assembly 85 are coupled together giving seating portion 11 a generally elliptical-shaped appearance as shown in FIG. 1. Lower seat frame assembly 83 includes two lower arcuate seat frame components 87, each having the same radius, pivotally connected at a first end 89 to a seat frame mounting member 91 to allow each of lower arcuate seat frame components 87 to pivot or rotate relative to seat frame mounting member 91. With specific reference to FIG. 12, seat frame mounting member 91 is detachably and rotatably disposed on a mounting bracket 93 that is fixably attached to housing 33 of hub 3. Mounting bracket 93 has a mediate portion 95 rotatably attached at a front end 97 of mounting bracket 93 by a pin 99. In one embodiment, mediate portion 95 is spring biased such that, when in use, the weight of an infant or child will cause seat frame mounting member 91 to push down on mediate portion 95 and, in turn, cause a bottom surface of mediate portion 95 to trigger a weight sensor (not shown). The weight sensor or other sensor designed to detect the presence of an infant or child in stroller 1 is operatively connected to a control system to disable accidental actuation of the drive system that causes stroller 1 to collapse as will be more fully described hereinafter.

Referring to FIGS. 1-10, upper seat frame assembly 85 is comprised of two upper arcuate seat frame components 101, each having the same arc radius. The arc radius of each of upper arcuate seat frame components 101 may be the same as the arc radius of lower arcuate seat frame components 87. This arc radius may be approximately 43 inches; however, this is not to be construed as limiting as the upper and lower arcuate seat frame components may have other arc radii. Upper arcuate seat frame components 101 are pivotably connected at their first ends 103 to an upper seat frame mounting member 105 to allow each of the upper arcuate seat frame components 101 to pivot or rotate relative to the upper seat frame mounting member 105.

Figure 3:
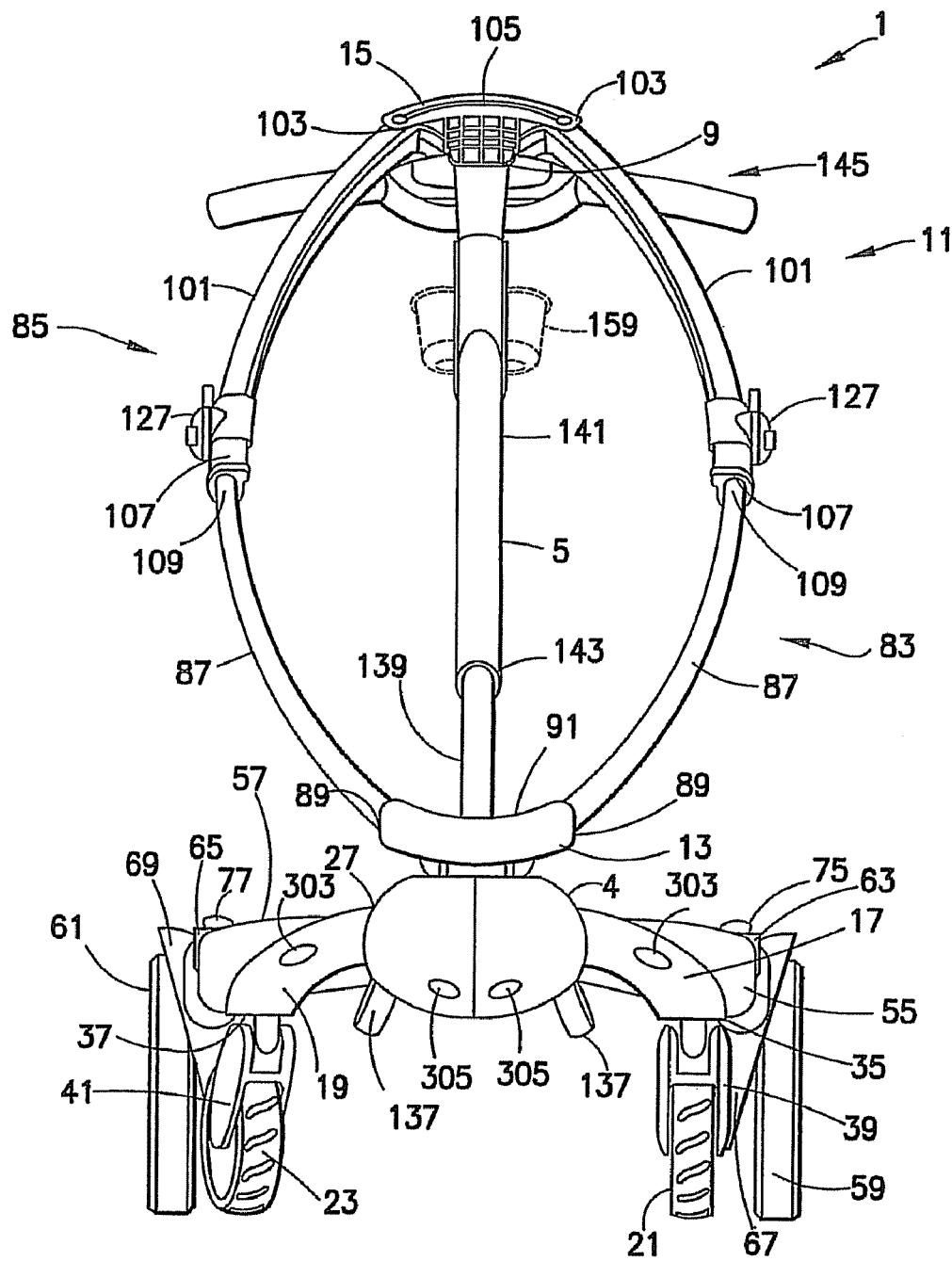
FIG. 3 is a front view of the stroller of FIG. 1 shown in its open position.
Figure 4:
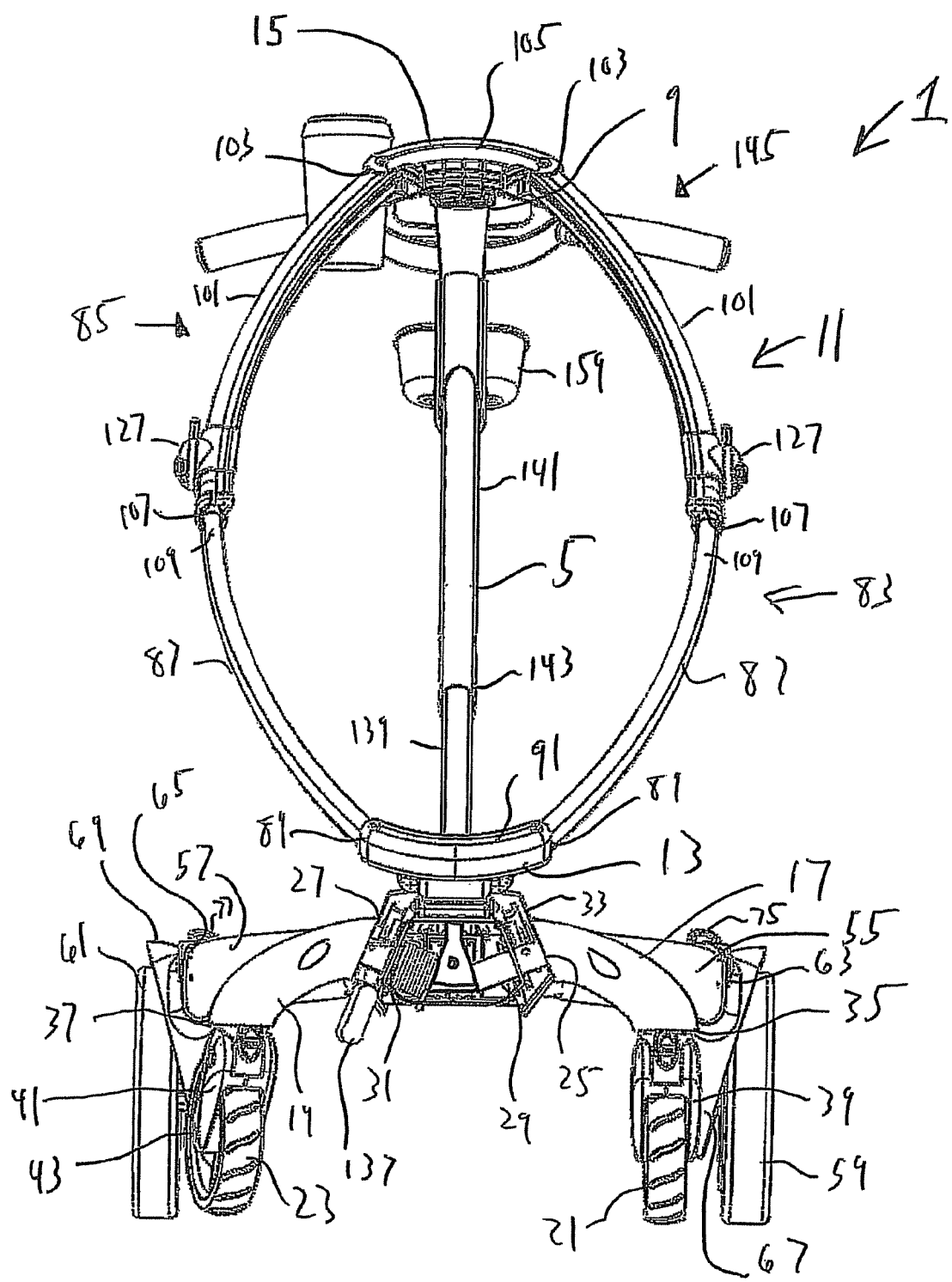
FIG. 4 is a front view of the stroller of FIG. 1 with a covering of a hub removed therefrom.

Each upper arcuate seat frame component 101 is slidingly mated, at a second end 107, to a second end 109 of its corresponding lower arcuate seat frame component 87, such that upon collapsing stroller 1, each lower arcuate seat frame component 87 will be slidingly received into its corresponding upper arcuate seat frame component 101. In an alternative embodiment, each upper arcuate seat frame component 101 may be slidingly received within its corresponding lower arcuate seat frame component 87. As best seen by FIGS. 3 and 10, this arrangement of lower arcuate seat frame components 87 and upper arcuate seat frame components 101 allows the overall width of the generally U-shaped upper and lower arcuate seat frame assemblies 83, 85 to decrease (consistent with the decrease in the lateral width of the wheels) as they move from their open position as shown in FIG. 3 to their collapsed position shown in FIG. 10.

Accordingly, it will be appreciated that stroller 1 provides a seating portion 11, a support structure 5, a pair of front legs 17, 19, and a pair of rear legs 55, 57 that define a linkage having a single degree of freedom, such that movement of any one of the seating portion 11, the support structure 5, the pair of front legs 17, 19, and the pair of rear legs 55, 57 relative to one another toward their collapsed or open positions may cause movement of the others toward their collapsed or open positions.

Figure 13:
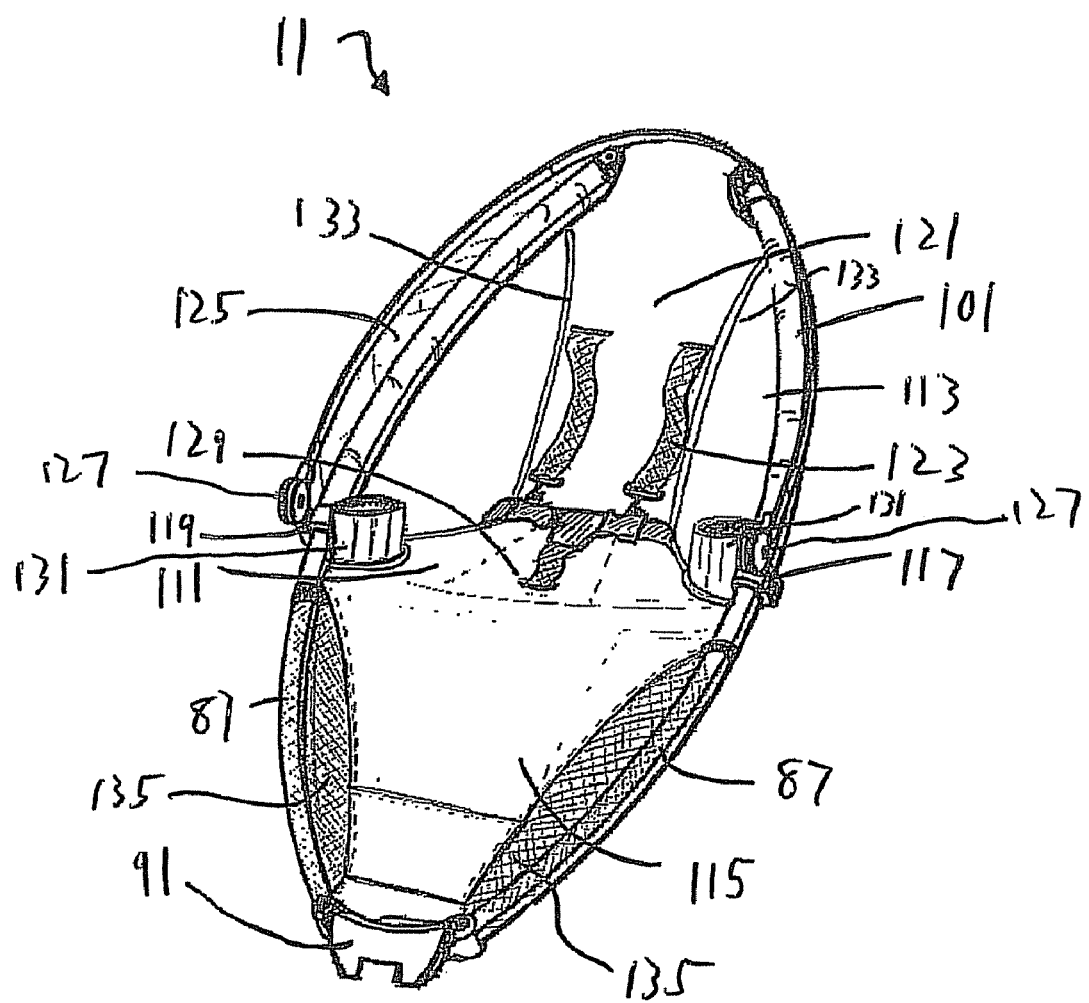
FIG. 13 is a perspective view of a seating portion of the stroller of FIG. 1 with a seat provided thereon.
Figure 14:
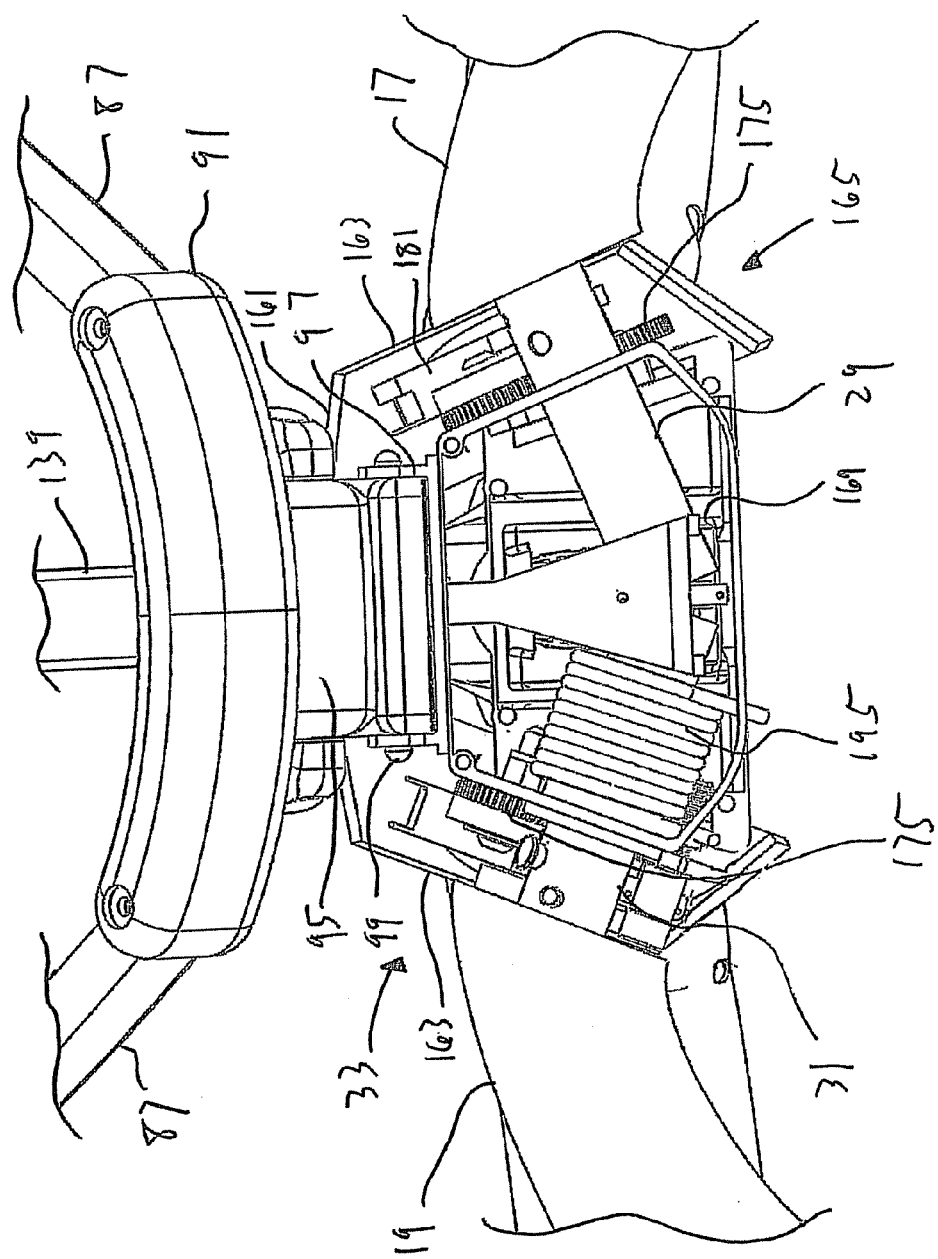
FIG. 14 is a front schematic view illustrating a drive mechanism of the stroller of FIG. 1.

With reference to FIG. 13 and with continued reference to FIGS. 1-10, another aspect of stroller 1 of the present invention is that seating portion 11 can be detached at lower seat frame mounting member 91 and upper seat frame mounting member 105 and replaced by either another seat or a different component. For instance, seating portion 11 can be removed and replaced by a seating portion that can seat two children. In addition, a car seat or bassinet adapter can be provided allowing a user to attach a car seat or a bassinet to stroller 1. In FIG. 7, seating portion 11 is illustrated as being detached from stroller 1. Seating portion 11 includes a seat 111 removably disposed upon seating portion 11. Seat 111 is desirably manufactured from a soft cloth-like material such that seat 111 collapses when stroller 1 is collapsed and expands when stroller 1 is opened. Seat 111 includes an upper seat portion 113 and a lower seat portion 115. Upper seat portion 113 securely sleeves around upper arcuate seat frame component 101 using snaps, zippers, or any other suitable fastening device for removably but securely fastening upper seat portion 113 to upper arcuate seat frame component 101 so that it is removable for cleaning or changing color, but is safely attached when in use. Upper seat portion 113 extends along and wraps around upper arcuate seat frame component 101 from a lower end collar 117 on one side to a lower end collar 119 on the other side. Upper seat portion 113 includes a seatback 121, infant securing straps 123, sunshade 125 secured to sunshade securing members 127, a seat bottom 129, and a pair of cupholders 131 integral to upper seat portion 113. As an example, cupholders 131 may be comprised of strips of padded fabric that are vertically stitched into the cupholder 131 to assist in maintaining its form. While not shown, an annulus can also be stitched into the top of cupholder 131 for better shape maintenance. Upper seat portion 113 may further include reflective piping 133 to enable a user of stroller 1 to be seen during conditions of low or reduced visibility.

With continued reference to FIG. 13, lower seat portion 115 extends from seat bottom 129 and is loosely sleeved around each lower arcuate seat frame component 87 with mesh or similar material in accordance with another aspect of the invention. Due to the fact that lower arcuate seat frame components 87 telescope into upper arcuate seat frame components 101 when stroller 1 is placed into the collapsed position, it is desirable for upper seat portion 113 to be connected to upper arcuate seat frame components 101 only because it does not need to collapse or fold vertically when the stroller is folded or collapsed. The lower seat portion 115, on the other hand, must accommodate the telescoping of the lower arcuate seat frame components 87 and the concomitant loss of space. Thus, at least an edge area 135 of lower seat portion 115, where it is attached to the lower arcuate seat frame components 87, must be constructed with material that does not inhibit or bind the telescoping action. In a preferred embodiment, this material is a fabric mesh.

In another aspect, stroller 1 may be provided with a cupholder tray device (not shown) having a base portion and a tray portion. The base portion is cylindrical and securely fits into either or both of cupholders 131 for a secure connection to upper seat portion 113. Disposed on the base portion, the tray portion extends flatly and in parallel with the ground to provide a multipurpose surface for the stroller occupant while still ensuring that there are no entrapment hazards, typically associated with fixed trays in the past. This cupholder tray device may be easily removed for cleaning or storage while the cupholders 131 are otherwise in use.

With continued reference to FIGS. 1-10, at least one luggage wheel 137 can be provided at a lower front portion of hub 3 of stroller 1 to facilitate transport of stroller 1 when it is in a collapsed position.

Figure 5:
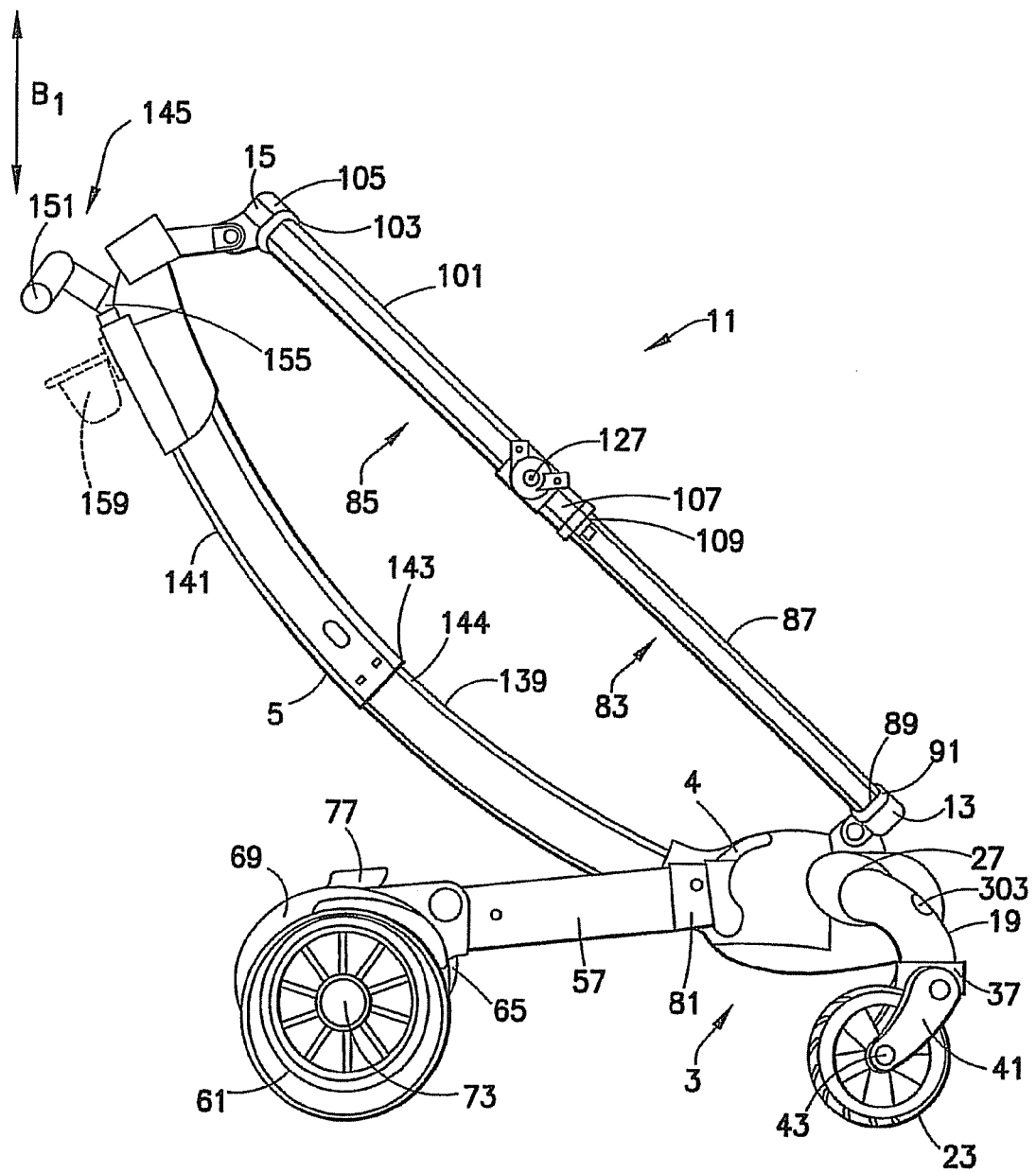
FIG. 5 is a left side view of the stroller of FIG. 1 shown in its open position.
Figure 6:
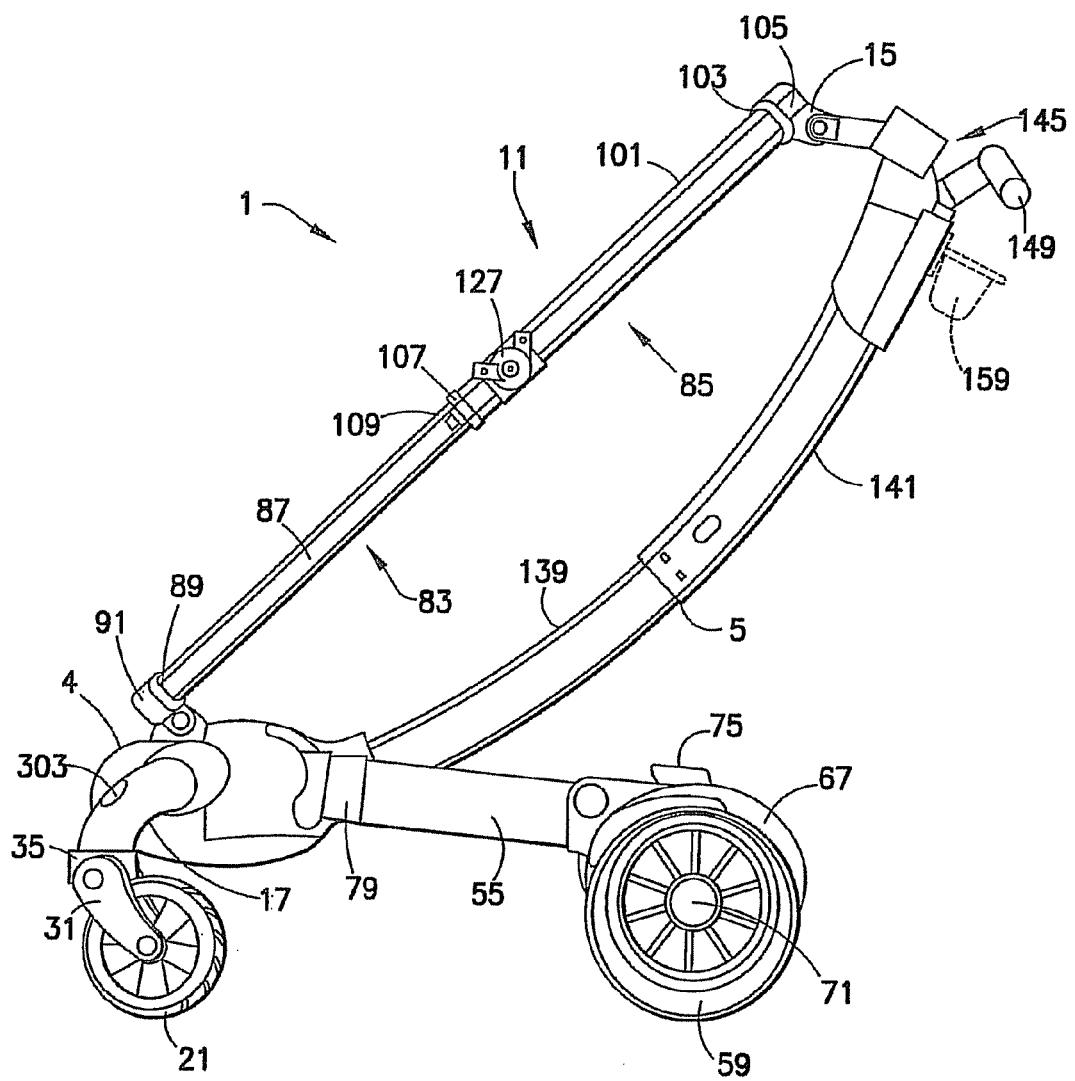
FIG. 6 is a right side view of the stroller of FIG. 1 shown in its open position.

With specific reference to FIGS. 5, 7, and 9, support structure 5 desirably has an arcuate shape and includes a lower arcuate support component 139 and an upper arcuate support component 141. As with upper and lower arcuate seat frame components 87 and 101, upper arcuate support component 141 is slidingly mated with lower arcuate support component 139 such that upon collapsing stroller 1, lower arcuate support component 139 slidingly sleeves on two sets of raised skis (not shown) into upper arcuate support component 141. An upper arcuate support component end portion 143 may have raised skis on an interior surface thereof that make contact with lower arcuate support component 139. End portion 143 of upper arcuate support component 141 is configured to be slidingly sleeved over an end portion 144 of lower arcuate support component 139 such that upon collapsing stroller 1, upper arcuate support component 141 will slidingly sleeve down over lower arcuate support component 139. As with the seat frame components 87 and 101, arcuate support components 139 and 141 are able to telescope or sleeve over or under each other because they have the same arc radius, but slightly different bore radii. A first end 7 of support structure 5 is fixably attached to the housing 33 disposed within hub 3.

Stroller 1 may be provided with a removeable storage bag (not shown). The storage bag is configured to be hanged from hooks or other fastening devices protruding from upper arcuate support component 141 at a point inside a line drawn between the center of each of rear wheels 59, 61. As a result of the hooks being placed in front of rear wheels 59, 61, a large amount of weight, whether from shopping bags or a fully loaded storage bag, will not cause an unsafe tipping condition as is seen in many current strollers.

In addition to the advantage of being able to collapse stroller 1 through the use of multiple arcuate components that can slide into each other, arcuate support assembly 5 has the additional advantage of supporting seating portion 11 and a handlebar assembly 145 with a single tube while providing significant clearance in the seat area of seating portion 11 to enable placement of a carry cot (not shown) or provide for a recline of the seat 111 without hitting arcuate support assembly 5.

Figure 2:
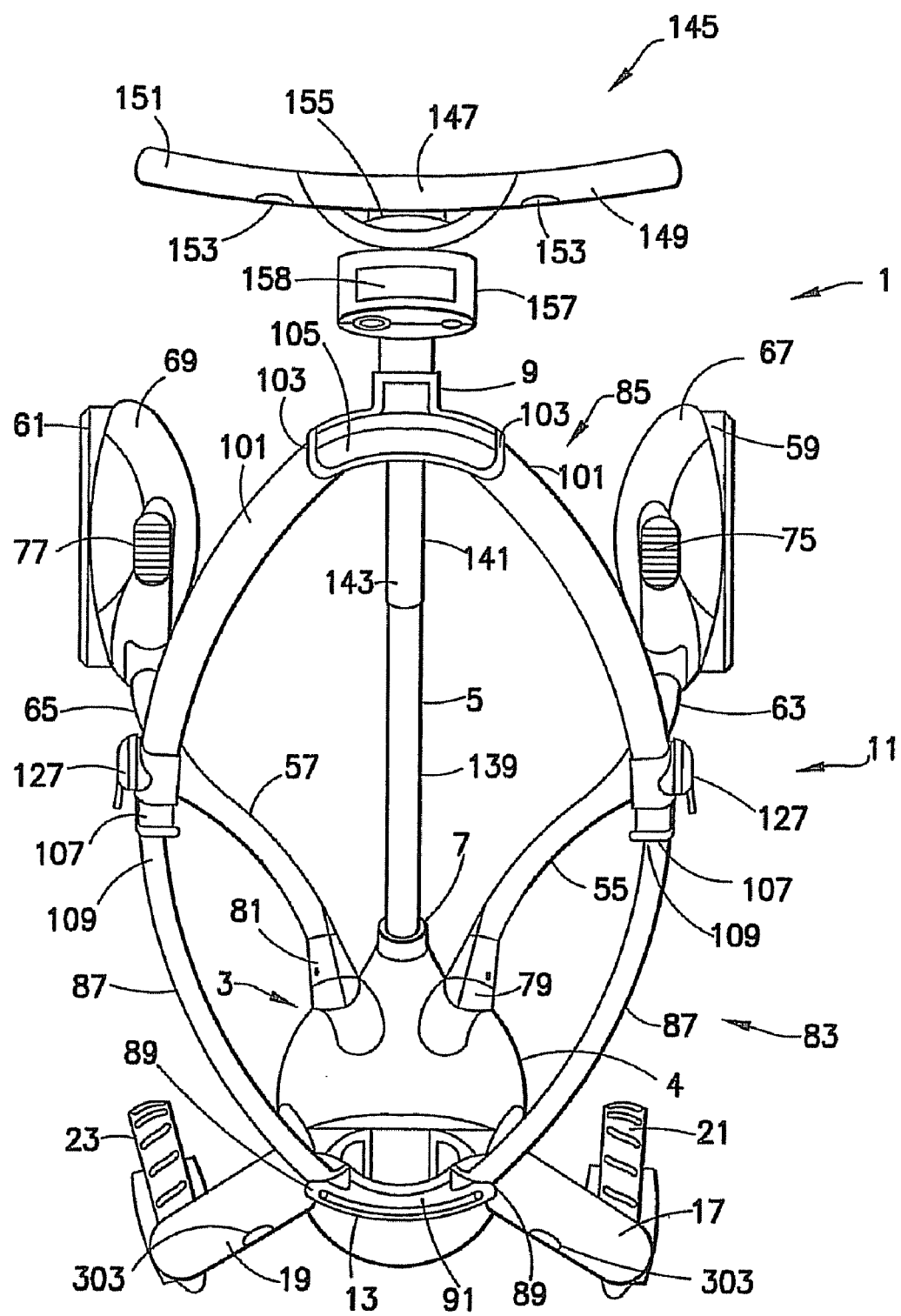
FIG. 2 is a top plan view of the stroller of FIG. 1 shown in its open position.

With specific reference to FIG. 2, second end 9 of support structure 5 is attached to a handlebar assembly 145. Handlebar assembly 145 includes a central component 147, a first handle 149 coupled to central component 147, and a second handle 151 coupled to central component 147. First handle 149 and second handle 151 allow a user to maneuver stroller 1. In addition, first handle 149 and second handle 151 are configured to move from a first, retracted position, as shown in FIG. 2, to a collapsed position by pushing buttons 153 and rotating each handle 149, 151 around central component 147. Central component 147 of handlebar assembly 145 is coupled to second end 9 of support structure 5 by a telescoping member 155. Telescoping member 155 extends vertically from second end 9 of support structure 5, thereby allowing a user to adjust handlebar assembly 145 for height in the directions of arrow $B_1$ shown in FIG. 5.

Handlebar assembly 145 may further include a controller interface 157 having a display portion 158 for actuating the powered aspects of stroller 1 of the present invention and for providing various other information as will be discussed in greater detail hereinafter. A storage compartment 159 may also be positioned at second end 9 of support structure 5.

With reference to FIGS. 14-18, housing 33 of hub 3 has a generally trapezoidal shape having a top surface 161 and two side surfaces 163 extending from top surface 161 at an angle. Housing 33 is preferably comprised of steel or another suitable material and provides a sturdy foundation for stroller 1. For explanatory purposes, some of elements of FIGS. 14-18 have been omitted so that other items may be viewed.

Figure 15:
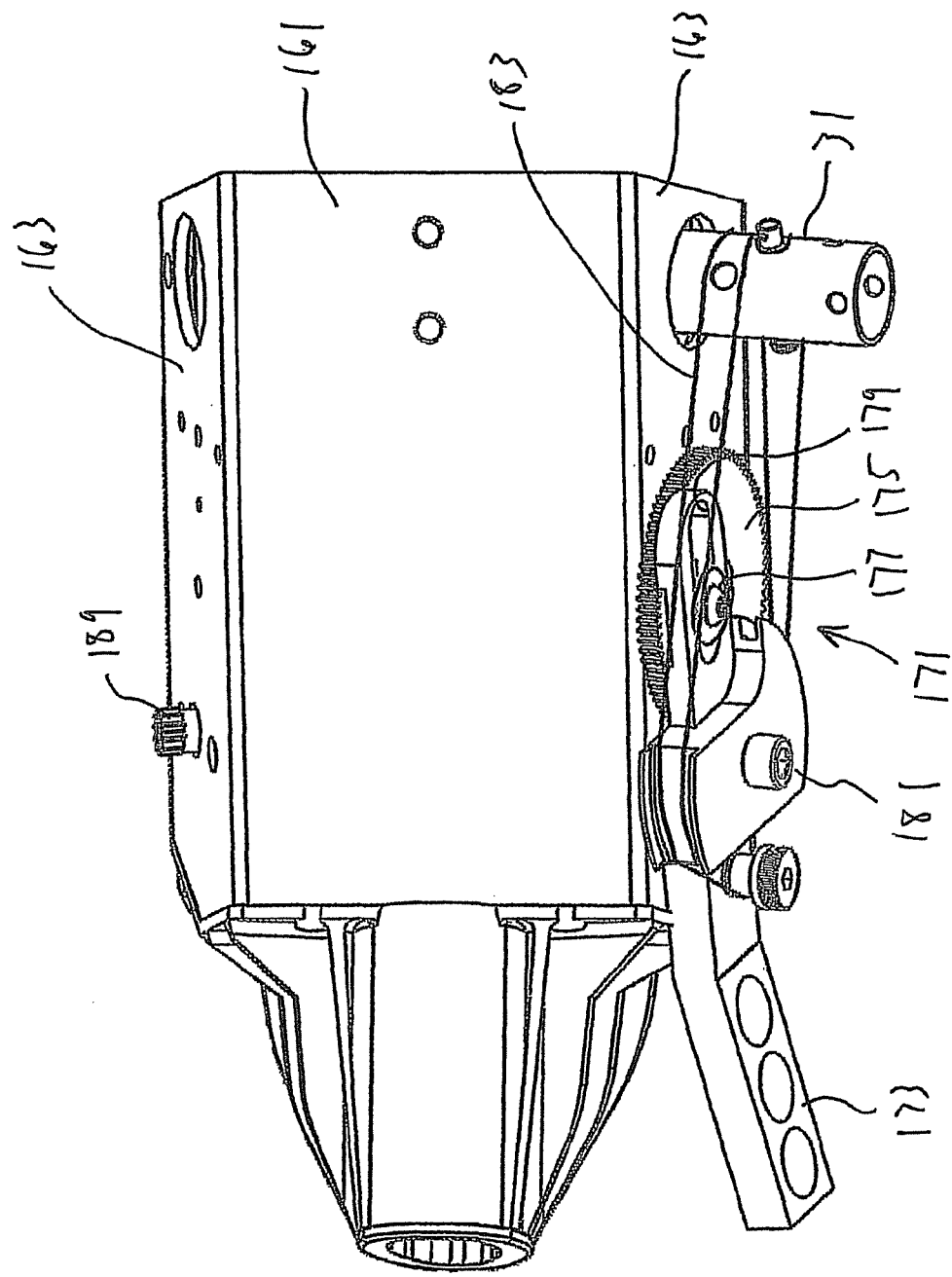
FIG. 15 is a top perspective view of a housing of the stroller of FIG. 1 illustrating a coupling mechanism.
Figure 16:
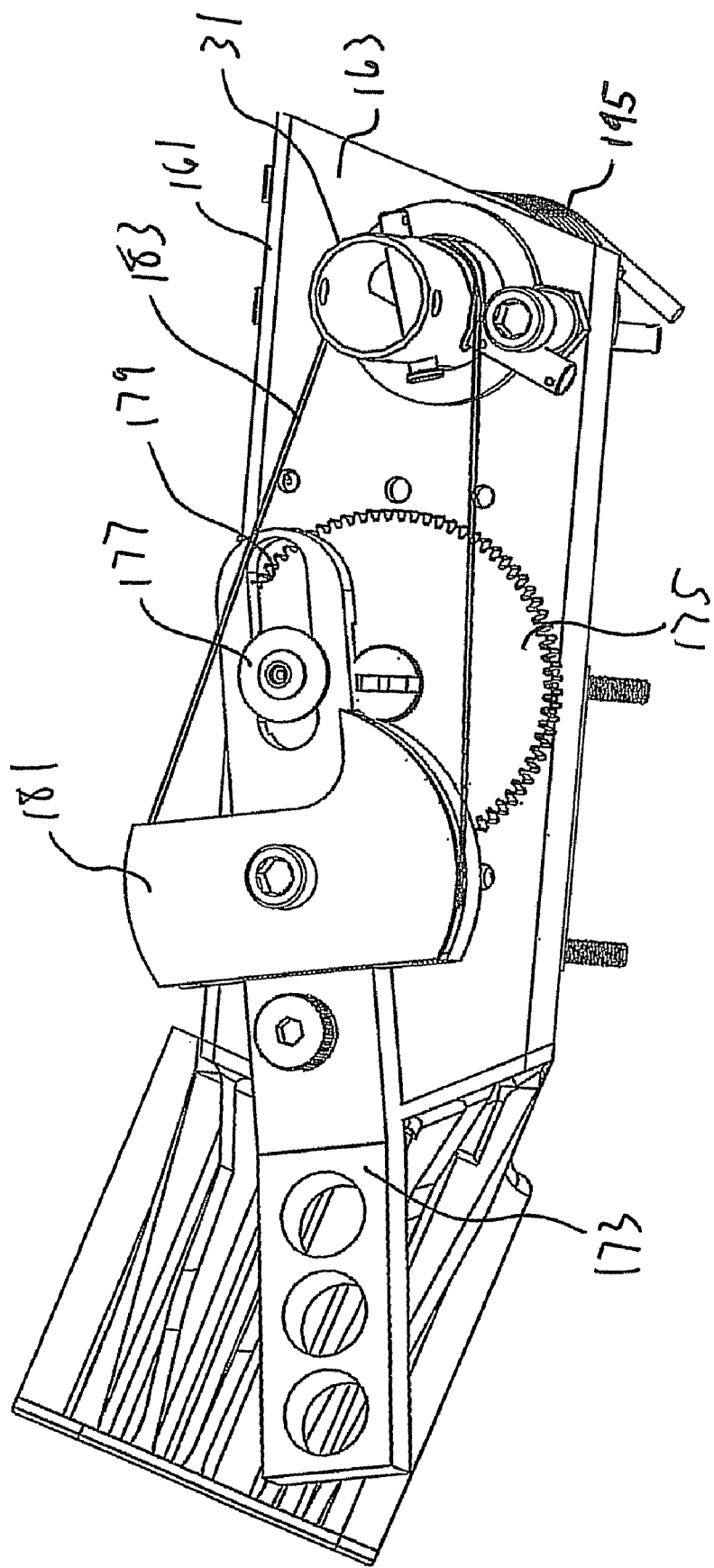
FIG. 16 is a side view of the housing of FIG. 15.

With specific reference to FIGS. 15 and 16, front legs 17 and 19 and rear legs 55 and 57 are mechanically coupled and configured to be driven by a single motor 167 as follows. A left coupling system 171 for the left rear leg 57 and left front leg 19 includes a rear leg mounting bar 173 to which rear leg 57 is fixedly coupled; a gear 175 mounted on side surface 163 of housing 33; a bushing 177 coupled to gear 175 and extending through a slot 179 provided at an end of mounting bar 173; a J-shaped spool component 181 fixedly coupled to mounting bar 173 between slot 179 and rear leg 57; and a cable 183 configured to wrap around J-shaped spool component 181 and post 31 of front leg 19. An identical right coupling system is mounted on the other side surface 163 for mechanically coupling right rear leg 55 and right front leg 17.

Housing 33 further includes a drive mechanism 165 mounted thereon which powers stroller 1 to be moved back and forth between its open and collapsed positions. More specifically, drive mechanism 165 is configured to mechanically link and simultaneously drive gears 175 of right and left coupling systems 171, thereby causing legs 17, 19, 55, 57 to synchronously expand or collapse. Drive mechanism 165 is further configured to cause the support structure 5 to expand or collapse as will be discussed in greater detail hereinafter.

Figure 17:
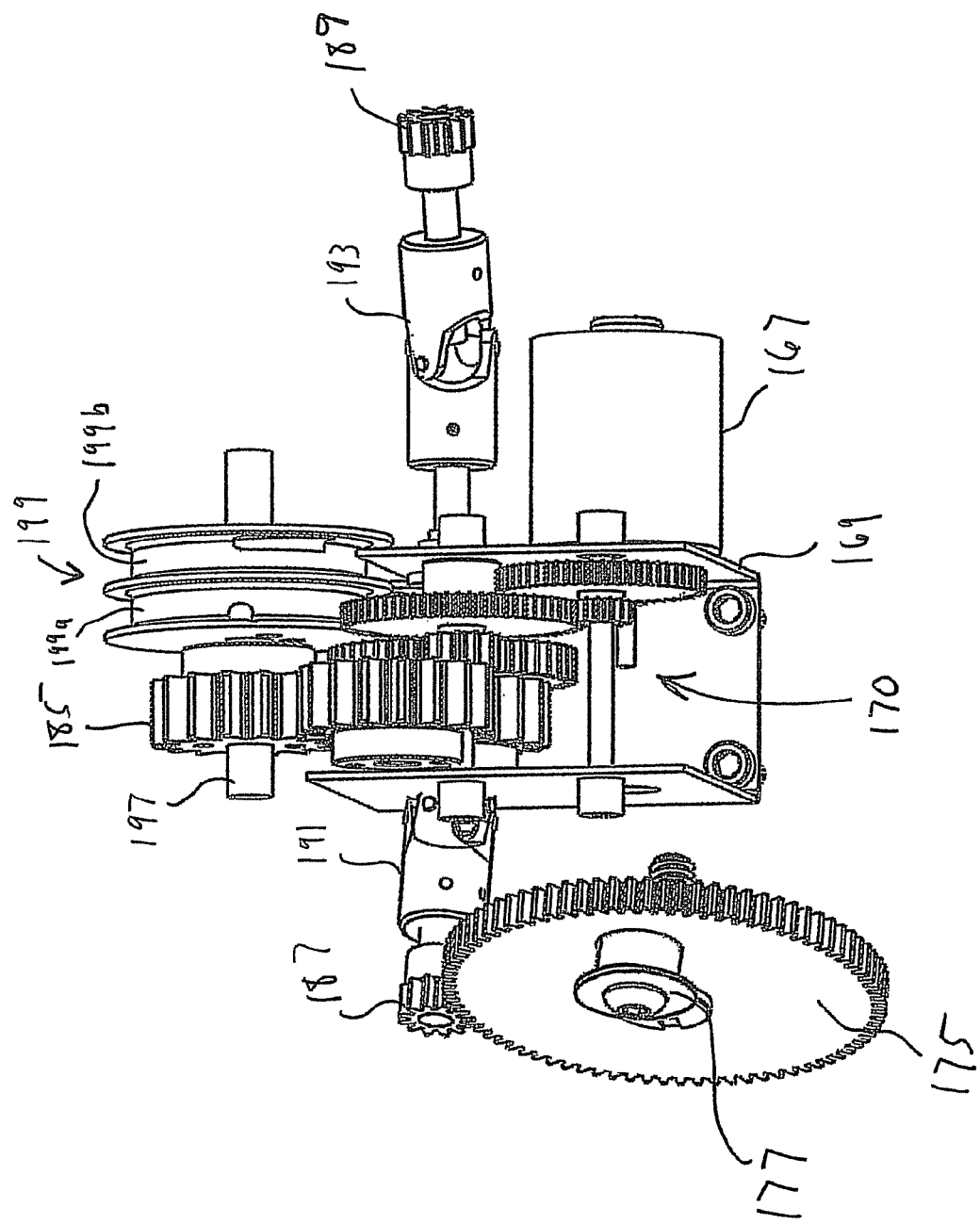
FIG. 17 is a top schematic view illustrating a motor and gear train of the drive mechanism of FIG. 14.

In one embodiment of the present invention, drive mechanism 165 includes a motor 167 mounted in a fixed position on an inner casing 169 of housing 33, and a gear train 170 positioned within inner casing 169 and having a first gear driven by a drive shaft of motor 167 (see FIG. 17). Gear train 170 is configured to allow a single motor (i.e., motor 167) to drive rotational drive spool gear 185 and first and second drive gears 187, 189 as will be discussed hereinafter. Motor 167 may be of a reversible type, or alternatively, a single-direction motor with mechanical reversing means.

With continued reference to FIG. 17, gear train 170 is configured to allow motor 167 to drive first and second drive gears 187, 189 through first and second universal joints 191, 193. First and second universal joints 191, 193 are configured to operationally couple first and second drive gears 187, 189 and gear train 170 and allow first and second drive gears 187, 189 to extend through and be positioned adjacent to angled side surfaces 163 of housing 33 as shown in FIG. 15. Accordingly, motor 167, through gear train 170 and first and second universal joints 191, 193, is capable of simultaneously driving first and second drive gears 187, 189. In addition, first rear leg 55 and second rear leg 57 are mechanically coupled between gear train 170 and first and second universal joints 191, 193. First and second drive gears 187, 189 are positioned to rotationally drive gears 175 of right and left coupling systems 171.

Figure 18A:
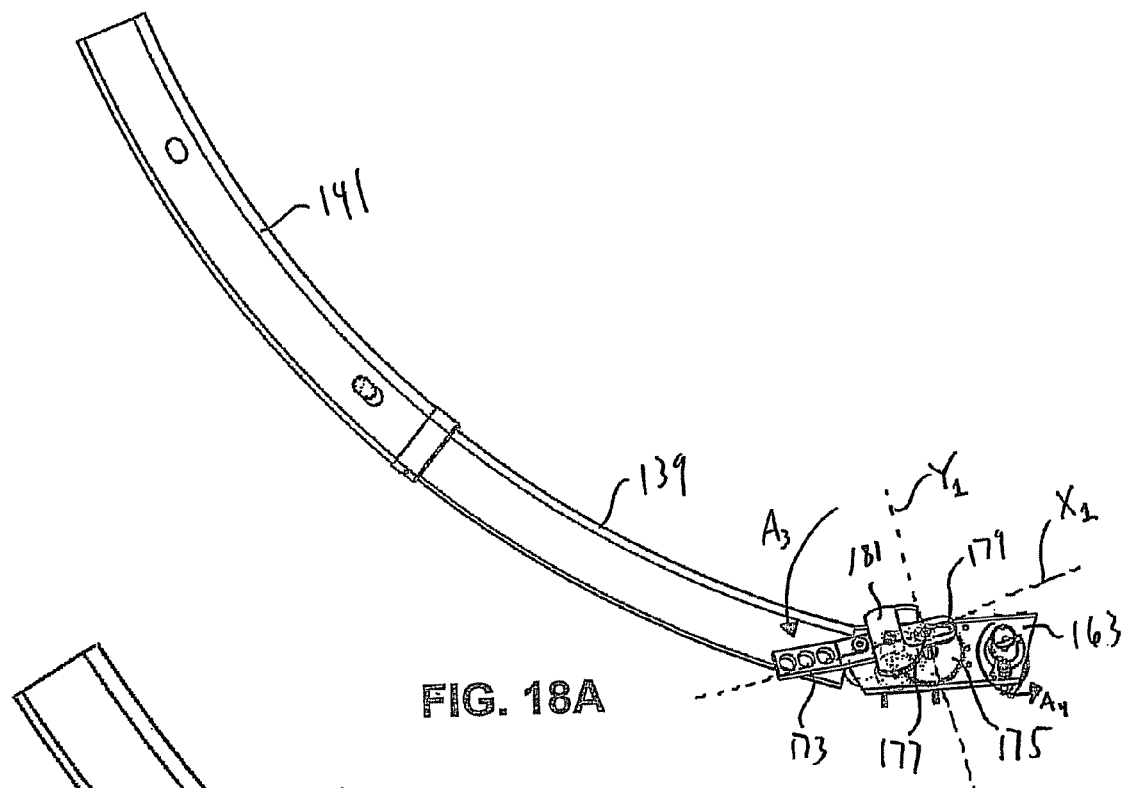
FIGS. 18A and 18B are side schematic views of a support structure of the stroller of FIG. 1 in an open position and a collapsed position, respectively.

With specific reference to FIGS. 18A-18B and with continued reference to FIGS. 14-17, the operation of drive mechanism 165 and coupling assembly 171 will be described in greater detail. Initially, stroller 1 is in an expanded position as shown in FIG. 18A. In this position, bushing 177 is aligned within slot 179 with an axle of gear 175 along axis $Y_1$. Axis $Y_1$ is perpendicular to an axis $X_1$ along which rear leg 57 extends. This configuration locks rear legs 55, 57 in the open position even if a user provides a downward force on legs 55, 57. When a signal is provided to drive mechanism 165 to cause stroller 1 to collapse, motor 167 drives gear train 170 which in turn drives universal joints 191, 193, causing drive gears 187, 189 to rotate. This rotation drives gears 175, causing bushings 177 to travel within slots 179 in rear leg mounting bar 173. This causes rear leg mounting bar 173, and thereby rear legs 55 and 57, to rotate in the direction of arrow $A_1$ to the collapsed position. In addition, since posts 29, 31 for supporting front legs 17, 19 are each mechanically coupled to respective rear legs 55, 57 by cable 183 connected to spool component 181, as rear legs 55, 57 rotate in the direction of arrow $A_1$, front legs 17, 19 also rotate in the direction of arrow $A_2$ to the collapsed position. In the collapsed position, bushing 177 is aligned within slot 179 with an axle of gear 175 along axis $Y_2$. Axis $Y_2$ is perpendicular to an axis $X_2$ along which rear leg 57 extends. This configuration locks rear legs 55, 57 in the collapsed position even if a user provides an upward force on rear legs 55, 57.

Figure 18B:
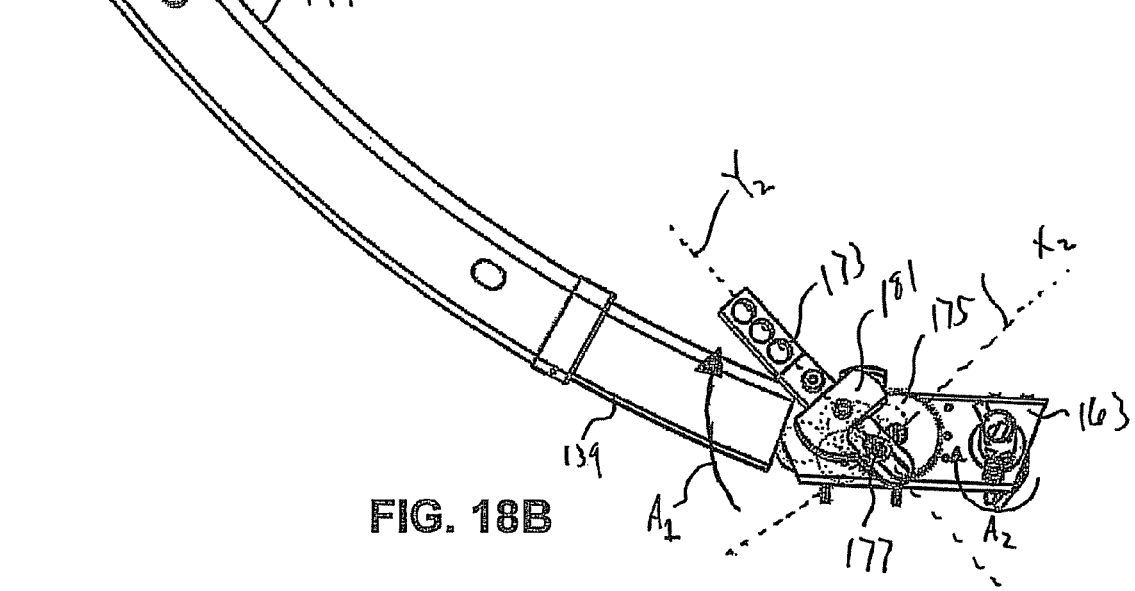

Once in the collapsed position as shown in FIG. 18B, drive mechanism 165 can be controlled to cause stroller 1 to return to the open position of FIG. 18A. When a signal is provided to drive mechanism 165 to cause stroller 1 to open, motor 167 drives gear train 170, which in turn drives universal joints 191, 193, causing drive gears 187, 189 to rotate. This rotation drives gears 175, causing bushings 177 to travel within slots 179 in rear leg mounting bar 173. This causes rear leg mounting bar 173, and thereby rear legs 55 and 57, to rotate in the direction of arrow $A_3$ to the open position. In addition, since posts 29, 31 for supporting front legs 17, 19 are each mechanically coupled to respective rear legs 55, 57 by cable 183 connected to spool component 181, as rear legs 55, 57 rotate in the direction of arrow $A_3$, front legs 17, 19 also rotate in the direction of arrow $A_4$ to the open position. This rotation of front legs 17, 19 may be aided by the placement of a spring 195 around posts 29, 31 that support front legs 17, 19. The use of such springs 195 allows a smaller, less powerful motor to be used in drive mechanism 165.

Figure 19:
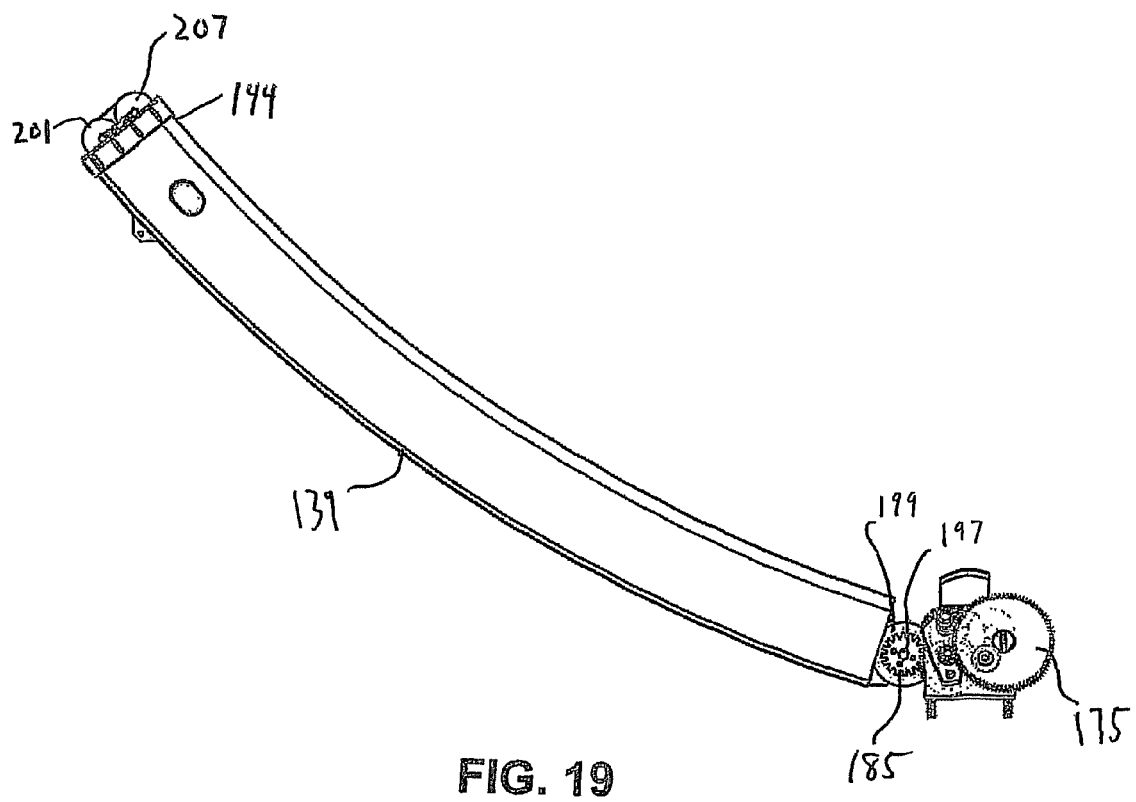
FIG. 19 is a side schematic view of a lower arcuate support component of the support structure of the stroller of FIG. 1.
Figure 20:
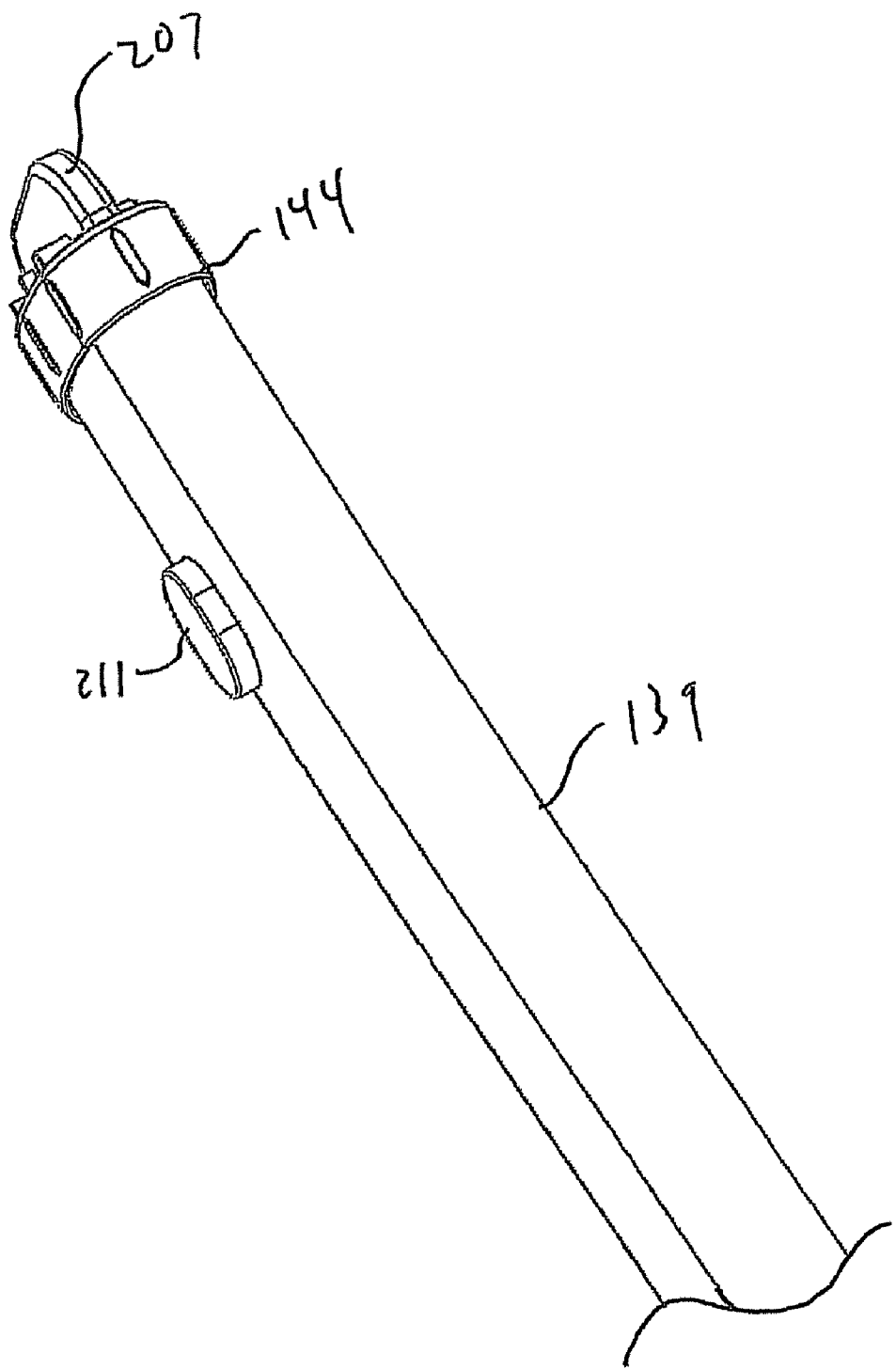
FIG. 20 is an enlarged view of the lower arcuate support component of the support structure of the stroller of FIG. 1 illustrating a latching mechanism.
Figure 21:
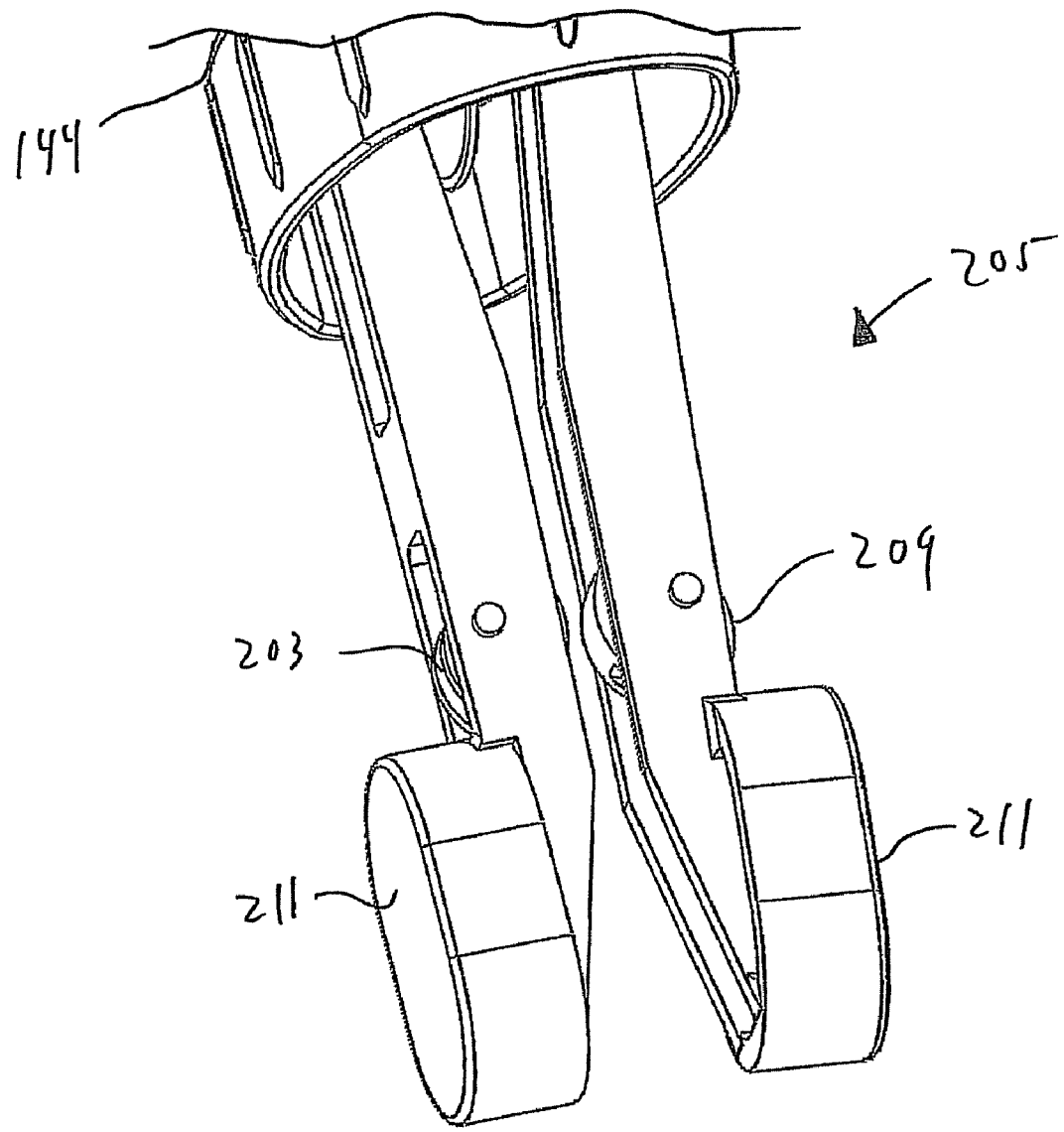
FIG. 21 is a side perspective view of the latching mechanism of FIG. 20.

With reference to FIGS. 19-21, and with continued reference to FIGS. 14-18B, seat portion 11 and support structure 5 are also movable between a collapsed position and an open position. In order to accomplish this, drive mechanism 165 further includes a spool gear 185 provided in gear train 170 and configured to be driven by motor 167. Spool gear 185 is fixedly attached to and configured to drive a spool shaft 197. Spool shaft 197 further includes a spool pair 199 having a first side 199a and a second side 199b fixedly attached thereto. A first cable (not shown) is run from a first side 199a of spool pair 199 up to and around a first key pulley 201 mounted inside end portion 144 of lower arcuate support component 139. The cable runs around first key pulley 201 and through a first pulley 203 of a latching mechanism 205. A second cable (not shown) is run from a second side 199b of spool pair 199 up to and around a second key pulley 207 mounted inside end portion 144 of lower arcuate support component 139. The cable runs around second key pulley 207 and through a second pulley 209 of latching mechanism 205. Latching mechanism 205 includes a pair of latch members 211 configured to extend through a recess 213 in upper arcuate support component 141. Since upper arcuate support component 141 is designed to slide over lower arcuate support component 139 as previously described, activation of spool pair 199 in either direction moves support structure 5 between an open and a collapsed position. Moreover, due to the fact that the seating portion 11 can also telescope as previously described, activation of the spool pair 199 also moves seating portion 11 between an open and a collapsed position.

Figure 22:
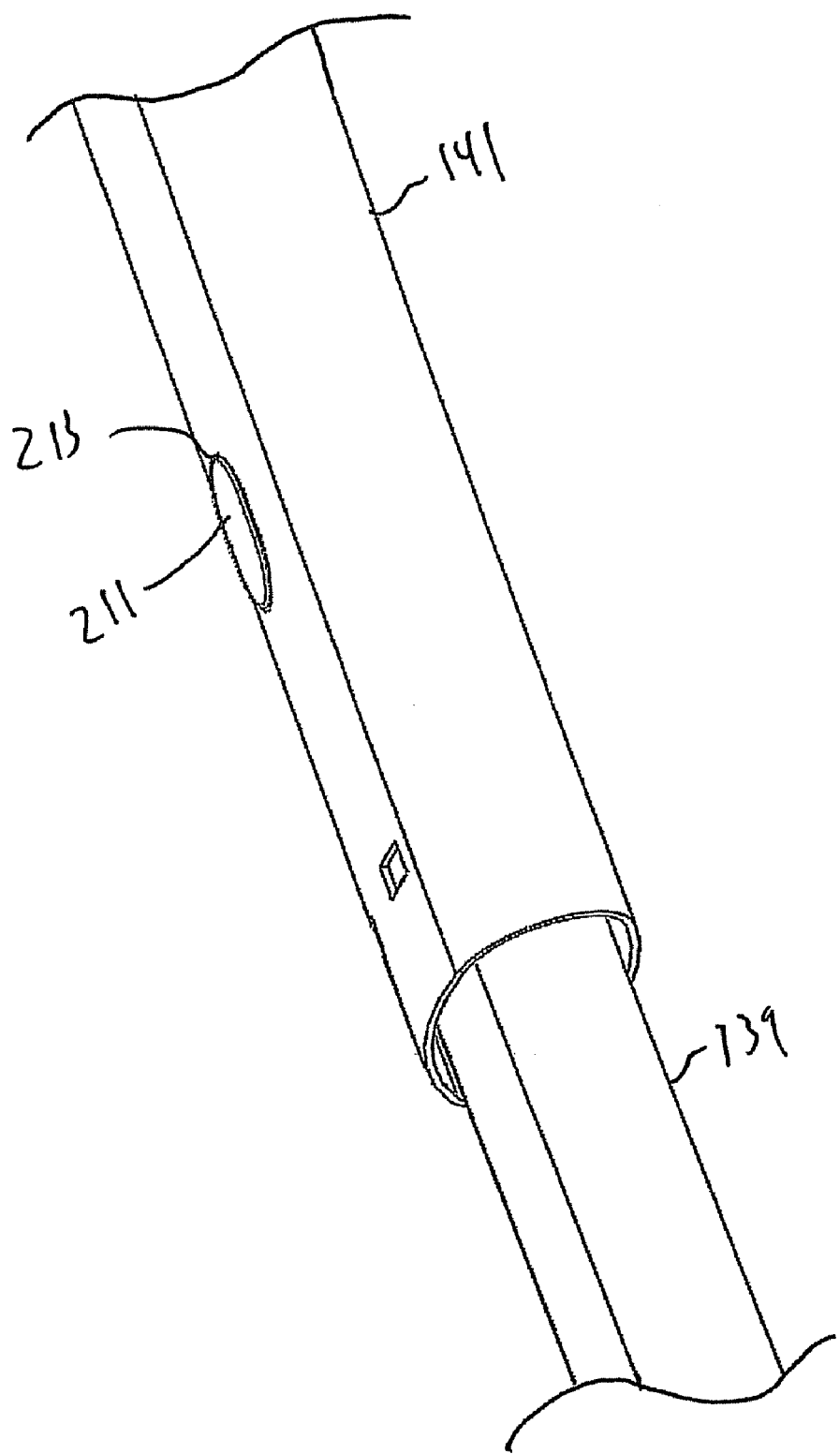
FIG. 22 is an enlarged side perspective view illustrating the latching mechanism of FIG. 20 engaged between the lower arcuate support component and the upper arcuate support component of the support structure.

When in a fully-open position, support structure 5 comprises latching mechanism 205 that ensures the stroller 1 remains open when in the open position. In one embodiment, latching mechanism 205 includes a pair of latch members 211 biased to extend outwardly from support structure 5. Latch members 211 are movable to a retracted position not extending outwardly from support structure 5. Recesses 213 for receiving latch members 211 when it is in its extended position are provided in upper arcuate support component 141 to receive and engage latch members 211 therein, and thereby engage lower arcuate support component 139 as shown in FIG. 22. Due to the single degree of freedom of the stroller linkage, this prevents the stroller from being moved toward its collapsed or folded position. The latch members 211 can be released from recesses 213 by moving the latch to its retracted position to disengage the latch members 211 and thereby disengage upper arcuate support component 141 to allow telescoping or sleeving movement of upper arcuate support component 141 over lower arcuate support component 139 and accordingly allow movement of the stroller toward its collapsed position.

After latch members 211 have been disengaged and the stroller has been moved to its collapsed position, and upon movement of the stroller toward its open position, latch members 211 are biased against the interior surface of upper arcuate support component 141 until the stroller is fully open, at which point latch members 211 are aligned with, and extend into, recesses 213 to prevent movement of the stroller toward its collapsed position until the latch members 211 are retracted.

Accordingly, as motor 167 is actuated, it causes gear train 170 to rotationally drive spool gear 185 and, correspondingly, the spool pair 199 whereby the cable (not shown) is simultaneously wound and unwound on the spool pair 199 and upper arcuate support component 141 is driven longitudinally along lower arcuate support component 139 between a collapsed and an open position. Correspondingly, the seating portion 11 is also moved between a collapsed and an open position. Hence, drive mechanism 165 is operatively engaged with support structure 5 and seating portion 11 to move them between their collapsed and open positions.

While stroller 1 was described hereinabove as including drive mechanism 165, this is not to be construed as limiting as other drive mechanisms may be utilized. For instance, U.S. Provisional Patent Application No. 61/094,574, entitled "Stroller", discloses an alternative drive mechanism. This application claims priority to U.S. Provisional Patent Application No. 61/094,574 and it is hereby incorporated by reference.

Additionally, as described hereinabove, drive mechanism 165 includes an electric motor 167 capable of moving the elements of stroller 1. However, this is not to be construed as limiting the present invention, as the drive mechanism may utilize a variety of other elements. For instance, but not by way of limitation, the drive mechanism may be a hydraulic or pneumatic drive, with hydraulic or pneumatic tubes extending from a hydraulic or pneumatic pump, internally and/or externally of one or more stroller components, to desired locations of the stroller to effect movement of one or more stroller components. Cables, running internally and/or externally of one or more stroller components, may be utilized. Suitable accommodation for the cables, pneumatic tubing, hydraulic tubing, and/or electrical wires is preferably provided to prevent pinching, folding, or other deformation, which would prevent suitable or optimal operation of these elements. An energy storing drive or drive mechanism (such as one utilizing a spring loaded element, other resilient element, or electromagnetic storage element), which stores energy when one or more stroller components are moved from one position to another for subsequent release of part or all of the stored energy to effect movement of the same or other stroller components, may be utilized. Rotary drives and/or drive mechanisms, or non-rotary drives and/or drive mechanisms may be utilized. One type of drive or drive mechanism may be utilized, or any combination of two or more drive mechanisms may be utilized either in combination with one another or individually.

Furthermore, the drive mechanism may be located at, or in proximity with, a location (or locations) on stroller 1 at which one or more stroller components are desired to be moved, or the drive mechanism(s) may be located remote from such location or locations, with suitable operative engagement extending between a remotely located drive mechanism and the location or locations on the stroller at which one or more stroller components are desired to be moved. Such operative engagement may include, for instance, cables, hydraulic tubes, pneumatic tubes, electromagnetic forces, electric wires, or any of a wide variety of other engagements.

Additionally, stroller 1 may be provided with additional latch or locking components operatively connected with drive mechanism 165, or a separate drive mechanism, which latches are moveable between a locking position which maintains the stroller in its collapsed position, and an unlocked position which allows the stroller to move from its collapsed position to its open position.

Figure 23A:
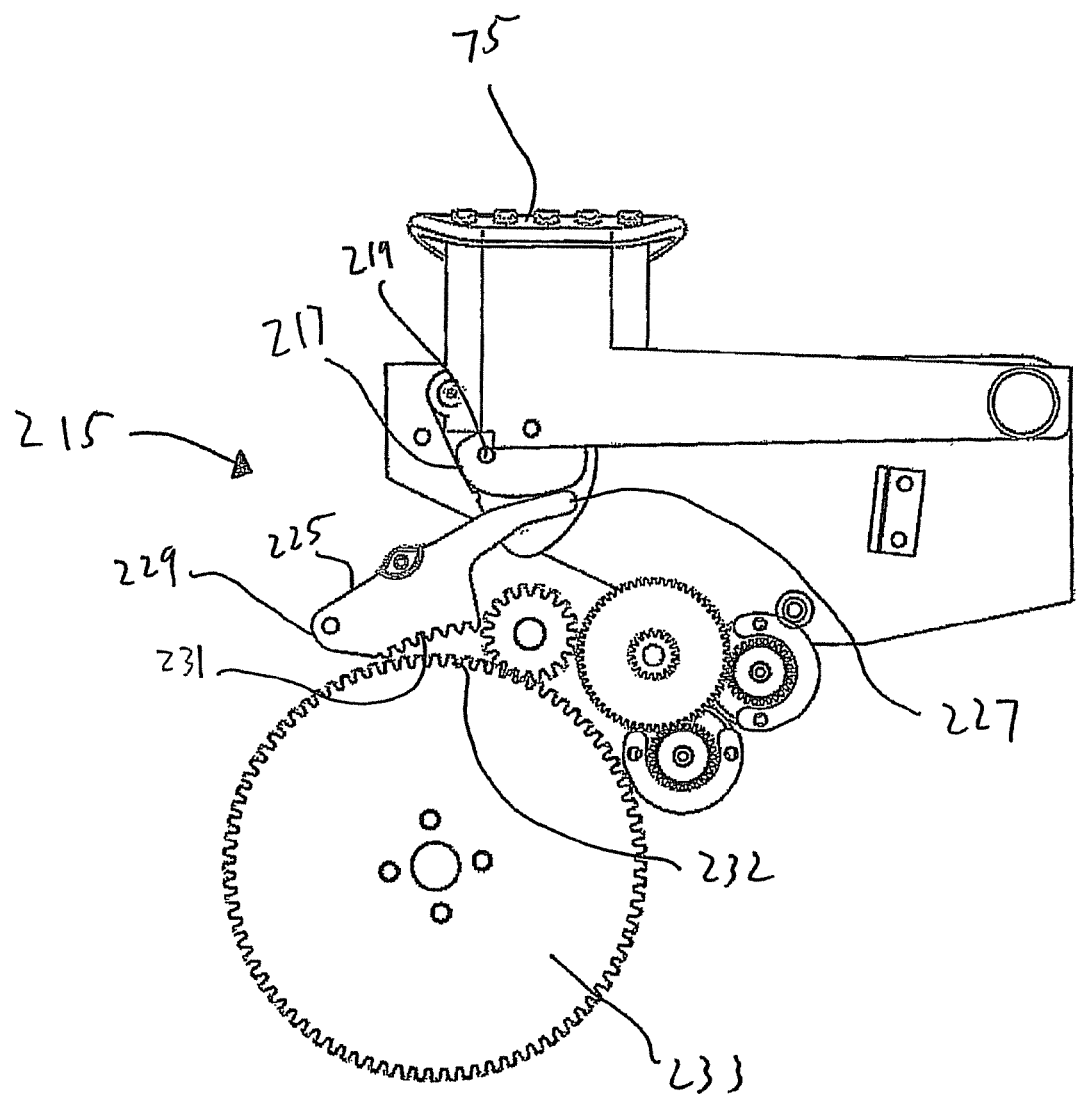
FIGS. 23A-23C are side schematic views of a braking mechanism of the stroller of FIG. 1 in the released, partially engaged, and engaged positions, respectively.
Figure 23B:
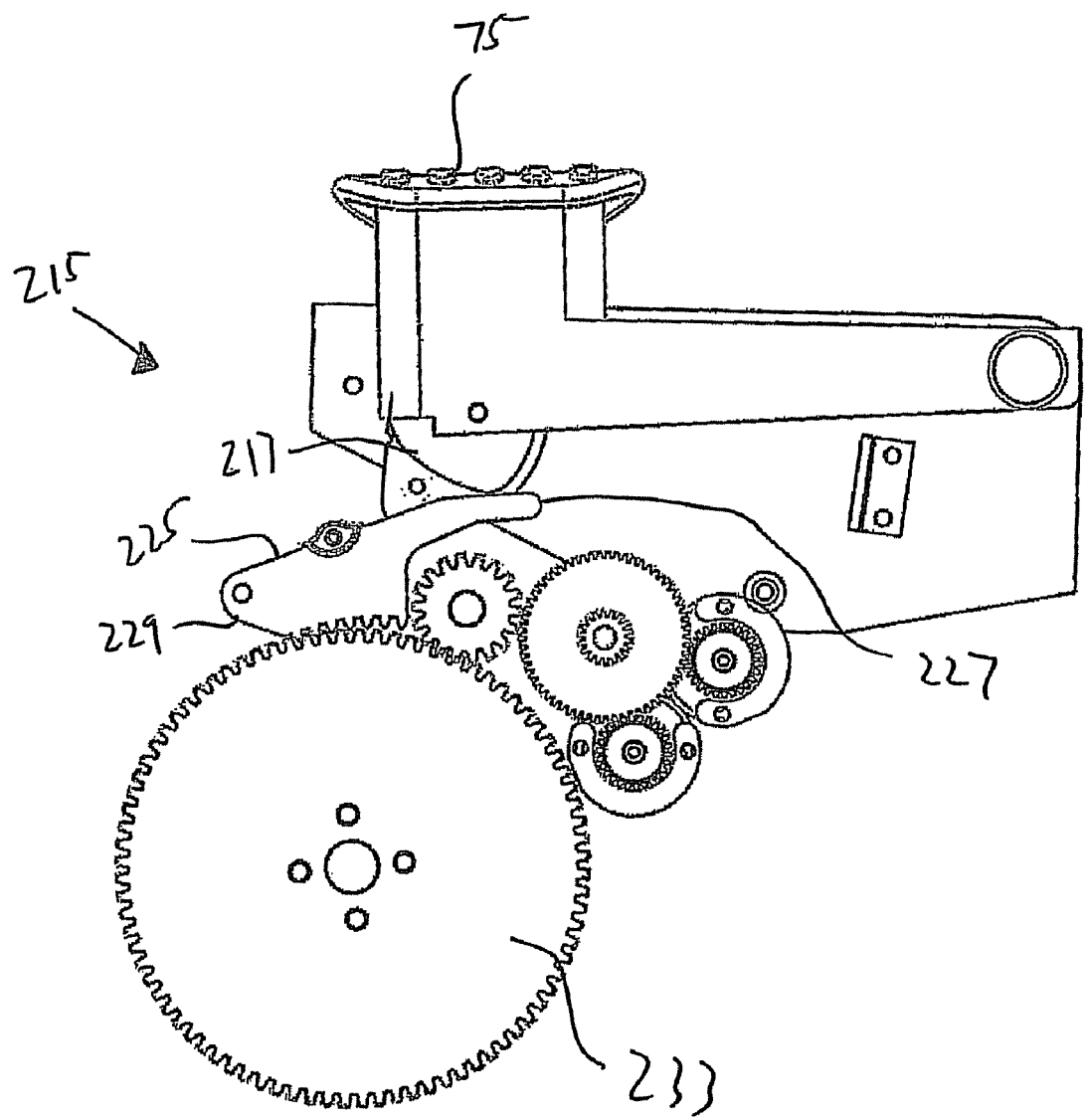
Figure 23C:
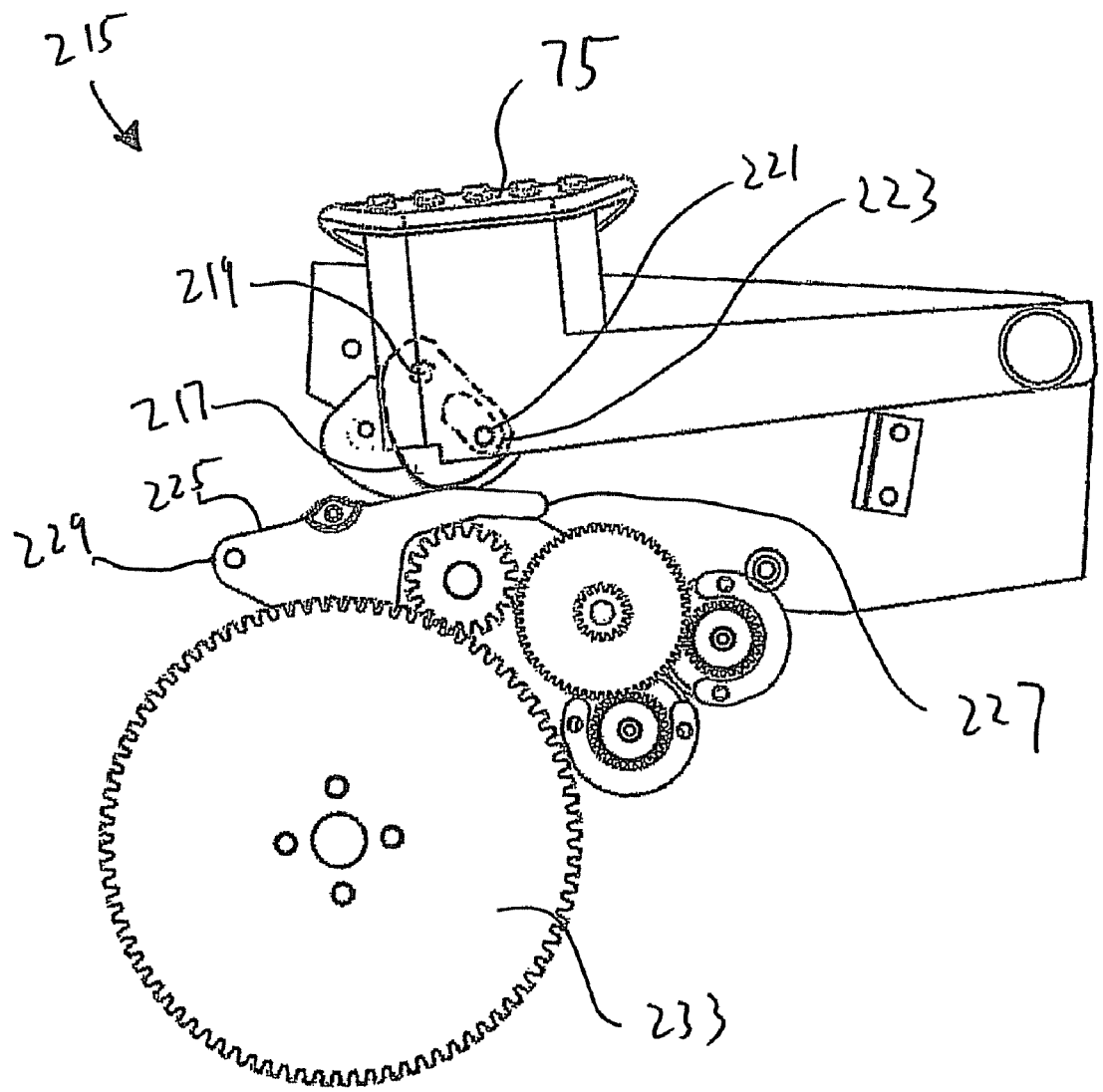
Figure 24:
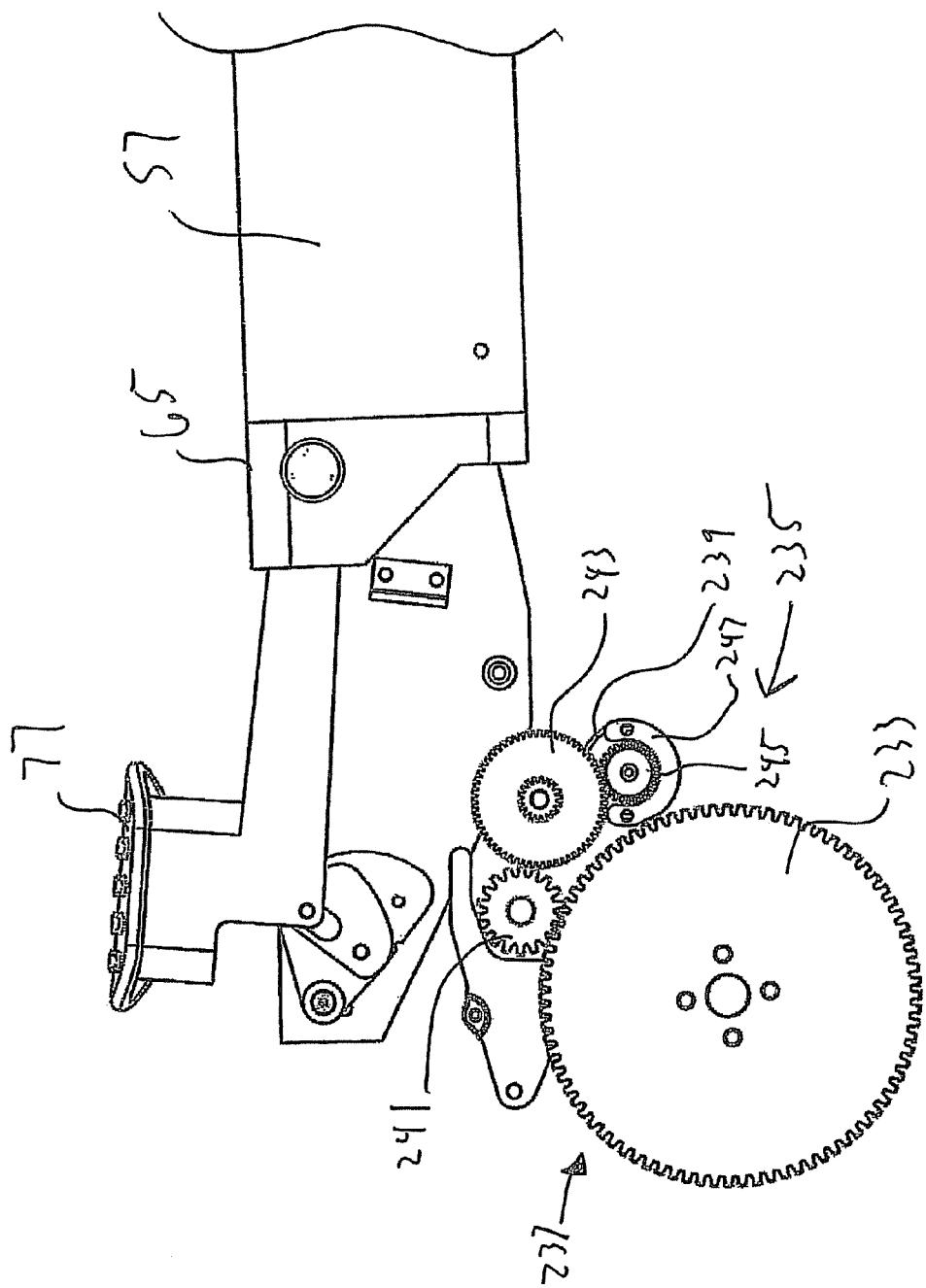
FIGS. 24 and 25 are side schematic and exploded perspective views of a generator system of the stroller of FIG. 1.
Figure 25:
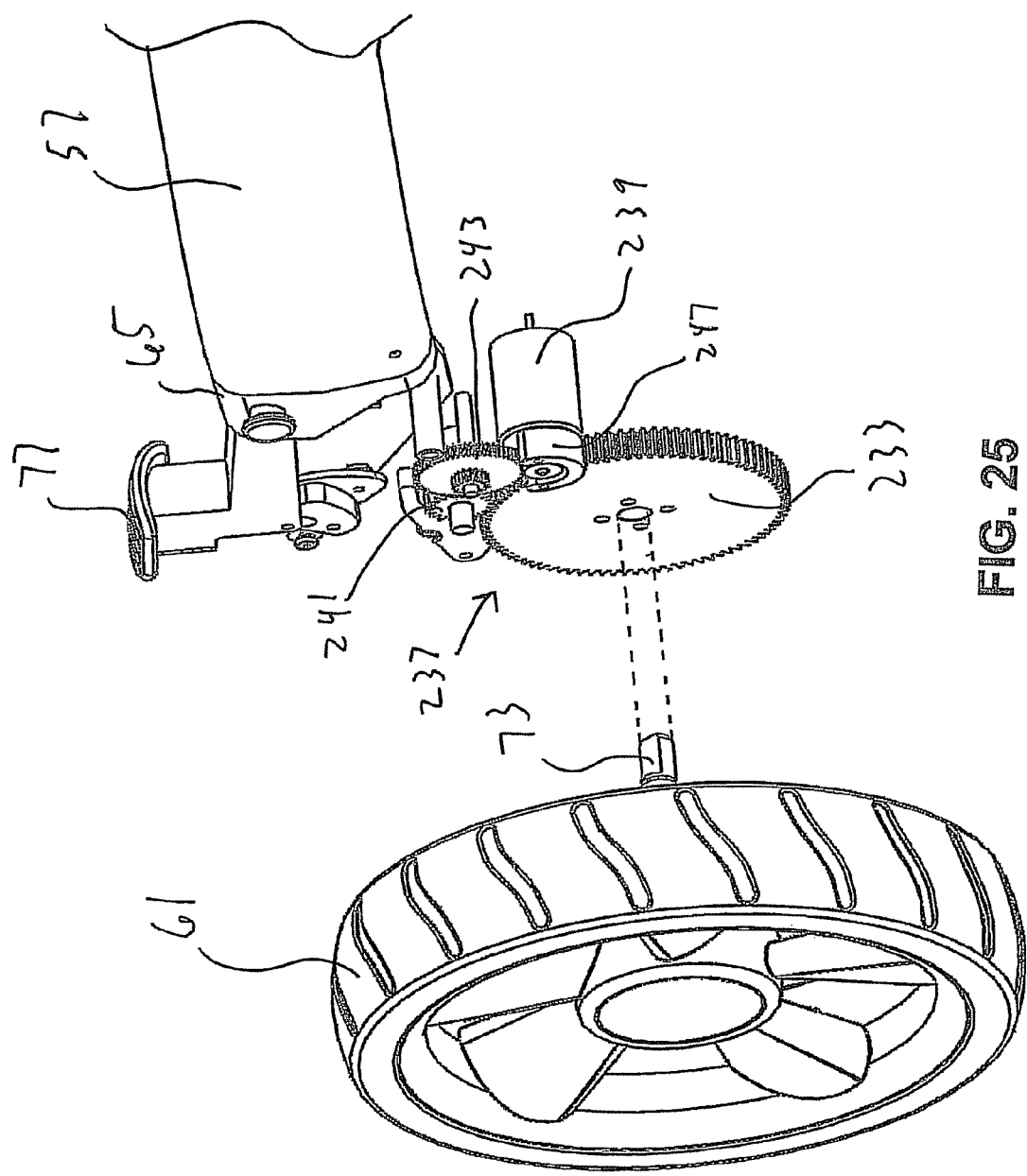
Figure 26:
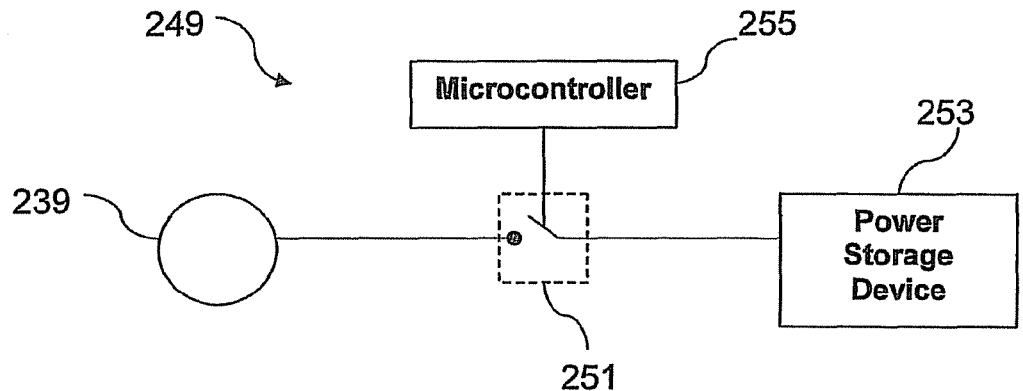
FIG. 26 is a block diagram illustrating a control system for the generator system of FIGS. 24 and 25.

With reference to FIGS. 23A-23C, a braking system 215 for stroller 1 is provided in first rear wheel housing 67 and second rear wheel housing 69 and operatively controlled by brake pedals 75, 77. The breaking systems 215 provided in each rear wheel housing 67, 69 are identical and accordingly only one braking system will be described hereinafter.

Braking system 215 includes a brake pedal 75 positioned such that it extends from rear wheel housing 69 and a braking cam 217 operationally coupled to brake pedal 75 and rotatable around a pivot point 219 from a first position (see FIG. 23A) to a second position (see FIG. 23C). More specifically, brake pedal 75 includes a peg 221 that is positioned within a slot 223 in the braking cam 217. As brake pedal 75 is depressed, peg 221 travels from a first end of slot 223 to a second end of slot 223, thereby causing braking cam 217 to rotate about pivot point 219. Braking cam 217 has a modified elliptical shape as shown in FIGS. 23A-23C. Braking system 215 further includes a brake lever 225 having a first end 227 configured to contact braking cam 217 when braking cam 217 is in the second position, and a second end 229 having a plurality of teeth 231 configured to engage the teeth 232 of a gear 233 driven by first rear wheel 59 of stroller 1 when braking cam 217 is in the second position, thereby preventing rotation of first rear wheel 59 and movement of stroller 1.

A first depression of brake pedal 75 causes braking cam 217 to rotate around pivot point 219 from the first position to the second position, thereby causing the teeth 231 of brake lever 225 to engage gear 233 to prevent rotation of first rear wheel 59. A second depression of brake pedal 75 causes braking cam 217 to rotate around the pivot point from the second position to the first position, thereby causing the teeth of the brake lever to disengage the at least one gear to allow rotation of the first wheel.

In addition, second rear wheel 61 includes a braking device positioned within second rear wheel housing 69 that is identical to braking system 215 and operationally coupled to brake pedal 75 via a cable (not shown) or any other suitable coupling device such that the depression of brake pedal 75 causes the actuation of the braking system provided in second rear wheel housing 69, thereby preventing rotation of second rear wheel 61. A second depression of brake pedal 75 releases the braking device provided in second rear wheel housing 69, thereby allowing rotation of second rear wheel 61.

With reference to FIGS. 24-27, stroller 1 is desirably configured to recharge or maintain a predetermined power level of its onboard power source through a dual generator system which is driven by the turning of the stroller wheels. The dual generator system includes identical generator systems 235 positioned in each of the rear wheel housings 67, 69. Since these generator systems are identical, only one of these generator systems 235 will be described hereinafter.

Generator system 235 includes a gear reduction system 237 operationally coupled between axle 73 of second rear wheel 61 and a generator 239. Gear reduction system 237 includes a plurality of gears, such as gear 233 which is driven by axle 73 as second rear wheel 61 rolls, second gear 241 driven by gear 233, third gear 243 driven by second gear 241, and fourth gear 245 driven by third gear 243. Fourth gear 245 is coupled to a drive shaft of generator 239 such that rotation of fourth gear 245 causes generator 239 to produce electricity. A rubber bushing 247 may be provided to surround all or part of generator 239 for noise reduction. Generator 239 may be embodied as an electric motor. Gear reduction system 237 is required because coupling a rear wheel 59, 61 directly to the motor used as generator 239 to recharge a battery is impractical since it would require a large velocity on the wheel in order to achieve the roughly 3,000 revolutions per minute or 50 revolutions per second for which such motors are typically optimized. In order to accomplish the desired recharging with the wheel and a motor, gear reduction system 237 is required.

An issue with a generator mounted on the wheel of a stroller is that if a gear-motor system as described hereinabove is directly connected to the stroller wheel with no electronic controls system, the amount of force felt by the user is not controllable and can at times be too large, thereby making it difficult for the user to push the stroller. In particular, higher rates of travel by the stroller will require greater forces. If the user were to jog with the stroller, the force would be large enough to be cumbersome. Accordingly, and with reference to FIG. 26, a control system for the dual generator system is required. Control system 249 includes a transistor 251, such as a MOSFET, provided between generator 239 and a power storage device 253. A microcontroller 255, or another suitable processing device, is provided to control the state of transistor 251. In other words, transistor 251 is turned on or off by microcontroller 255 such that transistor 251 either allows current to flow into and charge power storage device 253 or it blocks it from doing so. If no current is allowed to flow, generator 239 is not generating power and it is easy to turn (or push the stroller) regardless of the speed. Accordingly, microcontroller 255 pulses transistor 251 with a duty cycle with a certain proportion of "on" time. The greater that proportion, the more current is allowed to flow from generator 239 to power storage device 253. This "on" time is lowered in proportion as the user pushes the stroller faster to prevent them from feeling that there is too much resistance. In addition, microcontroller 255 is programmed to charge a smaller percentage of each duty cycle, and thus make stroller 1 easier to push, when the stroller is first moved from a standstill into motion. It is also within the scope of the present invention to program microcontroller 255 to modify the duty cycle to maximize recharging activity when the stroller is being pushed downhill, which can be monitored through the use of a MEMS gyroscope, a mercury switch, or other such device. This aspect has the added benefit of slowing the stroller on downgrades for safety. This is called regenerative braking.

An issue with charging a power storage device 253 from generator system 235 is that power storage devices can be overcharged and fail. To overcome this problem, transistor 251, with microcontroller 255 for controlling how much current is fed to power storage device 253, doubles as the tool through which the charging rate is controlled. For instance, if power storage device 253 is fully charged, microcontroller 255 will control transistor 251 to open to prevent additional current from flowing to power storage device 253. Power storage device 253 of the present invention is desirably a nickel metal hydride rechargeable battery and is positioned within housing 33.

Figure 27:
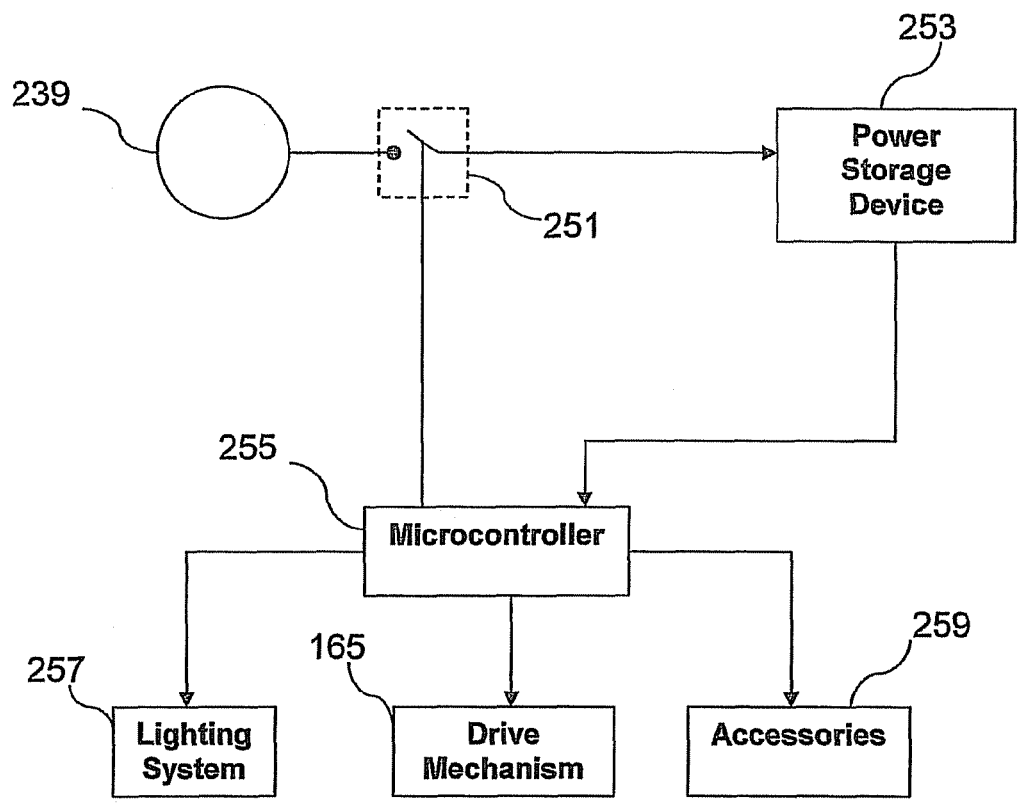
FIG. 27 is a block diagram of a power management system for use with the stroller of FIG. 1.

With reference to FIG. 27, microcontroller 255 also controls the distribution of power generated by generator 239 and stored in power storage device 253 to a plurality of subsystems, such as drive mechanism 165, a lighting system 257, and any of a plurality of accessories 259, such as speakers, a cell phone charging device, and a portable music player.

Stroller 1 includes lighting system 257 to enhance safety. Lighting system 257 includes two lighting subsystems that provide: a) constant lighting for safety purposes such that the stroller can always be seen; and b) pathway lighting so that irregularities in the path of travel of stroller 1 can be seen. The constant lighting subsystem includes a daytime running light 303 positioned on first front leg 17 and a daytime running light 303 positioned on second front leg 19. The daytime running lights 303 are positioned on front legs 17, 19 such that the light produced thereby is visible from 360 degrees around stroller 1.

The pathway lighting subsystem includes a pair of path lights 305 located underneath hub 3 and positioned to point forward. Accordingly, the path lights 305 cast light and illuminate surface irregularity in a path in front of stroller 1. Desirably, path lights 305 are located on hub 3 at a position that is within about 10 inches of pathway.

Lighting system 257 is powered by power storage device 253 which is charged by generator 239. Microcontroller 255 is operatively coupled to the constant lighting subsystem and pathway lighting subsystem and is configured to control the status of these subsystems. For instance, microcontroller 255 is configured to turn daytime running lights 303 on when the stroller is placed in the open position and off when the stroller is in the collapsed position. In addition, microcontroller 255 is configured to turn on path lights 305 in low light conditions so that the user can clearly see any irregularities in the pathway. The microcontroller 255 turns path lights 305 on based on either manual feedback from a user or automatic feedback from an ambient light detecting sensor (not shown) provided on stroller 1. Controller interface 157 may include an on/off switch for path lights 305 that a user can actuate. In addition, display 158 provided on controller interface 157 may provide a message to the user regarding the status of both daytime running lights 303 and path lights 305. Path lights 305 and daytime running lights 303 may be embodied as light emitting diodes (LEDs).

While stroller 1 has been described hereinabove as including a power generating system for generating power to be stored in a battery, the power source for driving motor 167 may be a replaceable and/or rechargeable battery or batteries, conventional battery or batteries, and/or a direct electrical supply such as that available from an electrical outlet. In addition, the power source may be permanently attached to the stroller, or may be removable for charging, replacement, or the like. To keep stroller 1 relatively low in weight and/or to keep production costs down, or for other reasons, a relatively small power source may be utilized which has sufficient power to move the stroller back and forth between its open and collapsed positions, but which does not have sufficient additional power to regularly or routinely power additional accessories or onboard systems without draining its power undesirably quickly. Alternatively, a larger power source may be utilized which not only has sufficient power to move the stroller back and forth between its open and collapsed conditions, but also has additional capacity to drive one or more additional accessories and/or onboard systems, which accessories and/or onboard systems may be integral with the stroller or may be modular additions or connections to the stroller.

Figure 28:
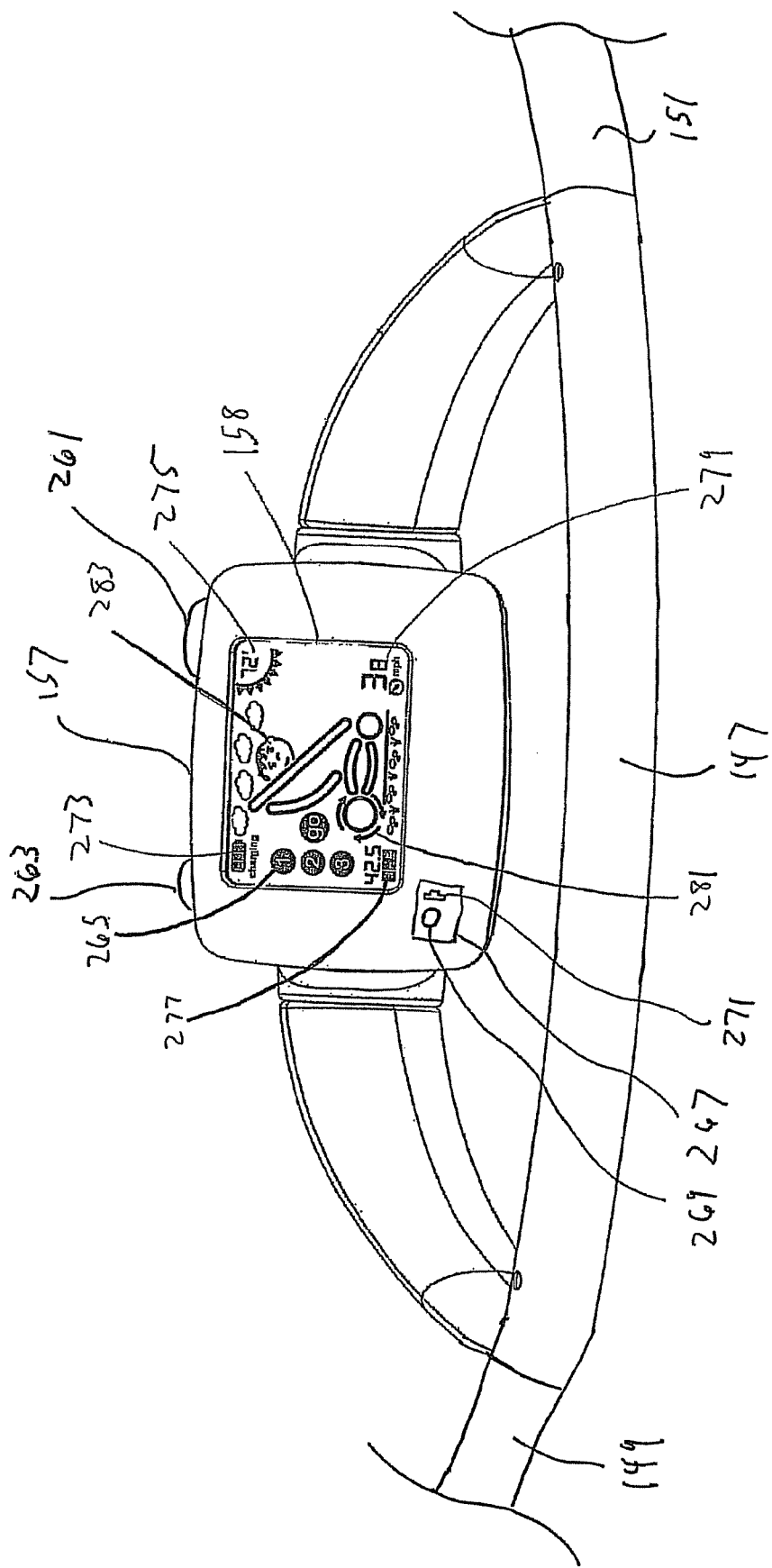
FIG. 28 is a top plan view of a handlebar assembly of the stroller of FIG. 1.

With reference to FIG. 28, a control switch 261 is provided, preferably in the controller interface 157, which may be an integral portion of handlebar assembly 145 or detachable therefrom, for causing actuation of drive mechanism 165. Control switch 261 is operatively connected to motor 167 through microcontroller 255 to control actuation of motor 167, which in turn controls drive mechanism 165, which in turn controls movement of the front legs 17, 19, rear legs 55, 57, and support structure 5 between their collapsed and open positions as discussed in detail hereinabove. Desirably, the wires extending between the control switch 261, microcontroller 255, and motor 167 are all disposed internally of the stroller elements, such as extending internally within hollow tubular members. The control switch 261, or a separate control switch and/or a common controller, may also be operatively coupled to one or more latch mechanisms to move the latch mechanisms from their latched positions in which they prevent the stroller from moving from its fully-open position toward its collapsed position, to their unlatched positions in which they allow the stroller to move from its fully-open position towards its collapsed position. Motor 167, or a separate drive mechanism, may be operatively connected to a control switch and/or controller to affect automatic movement of the latches upon actuation by control switch 261. The unlatching of the one or more latches is preferably carried out prior to, or simultaneous with, the initiation actuation of motor 167.

Alternatively, a control switch may be provided at, or in proximity with, one or more latches on the stroller (or operatively engaged with one or more latches), such that upon, or subsequent to, manually unlatching the one or more latches, the actuator is actuated to effect automatic movement of the desired one or more stroller components from a first position to a second position. That is, a control switch such as a position sensing switch (which may be an optical switch, electrical contact switch, or any other type of switch) may be provided which is operatively engaged with a controller which controls the actuation of the drive mechanism as desired (which may be in any of a wide variety of rates, sequences, options, etc.) The control switch or switches may be located and configured to be triggered or actuated during conventional manual unlatching of the latch or latches, or may be at a convenient location on the stroller which allows the control switch to be easily actuated while, or immediately subsequent to, unlatching of the latch or latches. It may be desirable to provide an arrangement in which two or more control switches associated with respective latches are required to both be actuated to effect automatic movement of the desired one or more stroller components from a first position to a second position.

In order to be consistent with stroller safety standards, it is preferred to have two separate and distinct actions taken to initiate folding of the stroller and, thus, two control switches may be employed to comply with such safety specifications. Accordingly, controller interface 157 used to control motor 167 to control the collapsing and opening movements, or other desired stroller component movements, of stroller 1 may be constructed and configured to have two or more discrete switches (such as control switch 261 and control switch 263) which need to be actuated simultaneously, or in a predetermined sequence or pattern, to effect actuation of motor 167 and thereby the movable components of the stroller, so as to prevent inadvertent movement of the stroller components, such as inadvertent movement of a stroller toward its deployed and/or collapsed positions. The two or more discrete switches 261, 263 are preferably spaced sufficiently apart from one another, or otherwise disposed relative to one another, so as to prevent inadvertent actuation of one switch upon actuation of the other switch. With reference to FIG. 28, a first control switch 263 is pushed, causing a timer 265 to count up to "three" whereupon a second control switch 261 is pushed by the user in order to actuate the stroller 1 folding or unfolding action.

The control switch or switches may be constructed to require that one switch, or a combination of switches, be engaged throughout the movement of the desired stroller components, such as during opening and/or folding operations of strollers designed for automatic opening and closing. Alternatively, a suitable control switch or switches, and/or suitable controller, may be provided such that only one actuation of a switch or switches is required to effect the desired movement of two or more stroller components, such as full movement of a stroller between its fully-deployed or open and/or fully-collapsed or folded positions. As a further alternative, a controller may be provided to move the stroller to a position intermediate its fully-open and/or fully-collapsed position, such as a midway condition as shown in FIGS. 7 and 8, with one actuation of a switch or switches, and further or complete movement of the stroller to its fully-deployed and/or fully-collapsed positions requiring a subsequent actuation of a switch or switches.

Microcontroller 255 is desirably programmed to automatically switch directions with each successive actuation. For example, should the movement of the stroller toward the fully-collapsed position be stopped at an intermediate point, such as upon a user noticing a toy in the stroller which is to be removed, but which has been enclosed by the partially-collapsed stroller, the user need only release the switch or switches and reengage them for movement in the opposite direction, toward the fully-open position. The motor may then be stopped and re-actuated for movement of the stroller to its fully-collapsed position.

The control switch and/or controller may be mounted on the frame of the stroller, such as on the rear wheel support member or elsewhere on the stroller, or alternatively, the control switch and/or controller may be separate from the stroller, such as on a key fob or other portable device, and operated using wireless technology. This may facilitate the ability of a user to hold a child or baby with both hands throughout the opening and/or collapsing of the stroller.

The controller may be configured and constructed utilizing any of a wide variety of known controller designs and/or mechanisms. For instance, the controller may utilize electrical contact switches and/or may utilize a processor, microprocessor, or microcontroller. Additionally, the controller may operate in conjunction with one or more sensors, such that upon actuation, or lack of actuation, of one or more sensors the motor does not operate even when the one or more switches, or other control actuation mechanism, which would normally actuate the motor, are properly actuated.

The controller may also be provided with switches or other actuators for controlling additional items such as a timer, an alarm clock feature, a music device, a monitor, a speedometer, a pedometer, or any other desirable items. If desired, a general auxiliary device connector 267 may be provided through which various auxiliary devices may be interchangeably connected and controlled by the controller and/or suitable control switch, which devices may be powered by the power source for the stroller, or through an independent power source. For instance, auxiliary device connector 267 may include a first port 269 for connecting speakers or a portable audio player, and a second port 271 for connecting a cell phone or other portable electronic device for recharging.

Controller interface 157 also includes display 158 mounted onboard stroller 1 to provide any of a wide variety of visual or audio feedback or ambient conditions to the user such as a battery level indicator 273, a temperature reading 275, an odometer 277, speedometer 279, clock (not shown), recharging indicator 281, the position of the stroller frame, whether the stroller will move toward its open or collapsed condition when next actuated, the presence of a baby or child in the stroller 283, instructions for use and operation of the stroller, emergency telephone numbers, environmental conditions, distance walked, average speed, or any other desired feature or parameter. Odometer 277 may be a permanent odometer providing a reading of the total distance traveled during the lifetime of stroller 1. Alternatively, controller interface 157 and display 158 may be provided remotely, such as on a key fob.

Stroller 1 may also include one or more object sensors having the ability to detect the presence of objects within the interior portion of the stroller and to interrupt and/or prevent movement of the stroller in the direction toward its collapsed condition when the object sensor detects the presence of an object within the interior portion of the stroller. The object sensor or sensors may be of any known type, or any type later developed, such as a mechanical weight sensor, a proximity sensor, a motion sensor, a light beam sensor, or any other device having the ability to detect the presence of an object within the interior of the stroller. The sensor or sensors may be electronic and may send a signal that is electrically acted upon to prevent or interrupt power to the motor, and/or the sensors may be mechanical and actuate a physical lock or a brake to prevent further collapsing or the full collapsing movement of the stroller. Sensors may also be used to detect the presence of modular add-on devices connected to the stroller, such that movement of the stroller to its collapsed condition is prevented when a connected add-on is detected, thereby preventing potential damage to the add-on device.

Stroller 1 may also include position sensors utilized at selective locations on the frame to send a signal indicative of the positions of one or more components or elements of the stroller. The position sensors can be used for several purposes, such as sending a signal to the display to provide a visual and/or audio indication to the user as to the current position or of the deployment or the collapsing of the stroller and/or to provide an interrupting signal (or non-signal) if a position sensor or sensors are not engaged as they would be during proper deployment and/or collapsing of the stroller. Any one or more of several known types of sensors may be utilized, such as rotary encoders at any one or more frame component pivot points, and/or limit or contact switches which are engaged as selective elements of the stroller move to their proper positions, or improper positions, during deployment and/or collapsing of the stroller. By way of example, position sensors may be mounted to the stroller at positions which provide indication that the stroller has moved to its fully-deployed condition, its fully-collapsed condition, or any condition in-between; and/or position sensors may be mounted at locations to detect the engagement or lack of engagement of latches. Position sensors may operate in conjunction with electronic timer controls such that a signal to effect stoppage of power to the motor is sent if the position sensor is not engaged within a predetermined time period.

A resistance sensing device and/or timer may be operatively connected to the controller to stop movement and/or move toward the unfolded or open position when folding is interrupted, e.g. when too much resistance toward folding movement is encountered or when the fully-closed position is not achieved within a predetermined time. Alternatively, or additionally, a clutch may be provided between the motor and the elements to which it is connected to provide slippage of the driving force of the motor if too much resistance is encountered.

A manual override may also be provided to allow manual movement of the stroller between its open and closed positions and/or manual movement of any stroller components between their first and second positions, which would normally be carried out automatically by a drive mechanism. Such manual override may be desirable for any of a number of reasons, such as the power source being too low to effect the desired automatic movement or the failure of any parts.

A wide variety of manual override mechanisms may be utilized in connection with the present invention. For instance, a clutch or clutches may be provided between one or more drive mechanism elements and their associated stroller components for use as a manual override, whereby the clutch may be moved to a position in which it effects disengagement of the drive mechanism. As another example, a mechanical lever or rotary element may be provided at any point in the drive mechanism and/or between the drive mechanism and one or more stroller components associated with the drive mechanism, which is movable between an automatic position (in which a drive mechanism is operatively engaged with one or more stroller components to move the one or more stroller components automatically) and a manual position (in which a drive mechanism is disengaged from its operative engagement with one or more stroller components).

It will be appreciated that the above is merely by way of example, and that a wide variety of disengaging mechanisms may be utilized with a wide variety of different stroller designs, without departing from the inventive concepts of the present invention.

The movement or movements of the inventive strollers of the present invention can be carried out in a wide variety of ways, such as telescoping of components, sliding of components, pivoting of components, rectilinear movement of components, cam driven or guided movement of components, or any other known linkage which allows movement of two or more components relative to one another.

Furthermore, virtually any stroller construction which has one or more front wheels and one or more rear wheels, or having any other wheel configuration such as a circular arrangement of the wheels, left and right wheels, or any other arrangement, in which the stroller has some type of drive for moving at least one of the wheels from a first position to a second position may be constructed. In accordance with another aspect of the invention, virtually any stroller construction can be utilized which allows automatic movement of at least one of its wheels from an open position to a collapsed position, or back and forth between collapsed and open positions, or between an extended position and a retracted position. In accordance with another aspect of the invention, a stroller may be provided having a frame with one or more components, which may be wheel components and/or other stroller components or attachments (or components to which attachments may be connected) with a drive operatively connected with the one or more components to move them from a first position to a second position. This may be used for automatic movement of the components between any desired first and second positions. In accordance with another aspect of the invention, one or more stroller components or attachments may be moved between three or more selective positions by the drive mechanism and/or control switches, and/or one or more controllers.

Backup mechanical systems may be provided to serve as the drive for moving the wheels and/or other stroller components. A mechanical system(s) may use elements common with the automatic system(s), use independent element(s), or both. Stroller 1 may also be provided such that front and/or rear wheels move front to back and/or back to front and/or side to side and/or top to bottom and/or bottom to top. This may apply to other stroller components as well. For instance, a stroller may be provided in which the wheels of the stroller remain on the ground or otherwise relatively stationary, while other stroller components move forwardly and/or rearwardly and/or sideways and/or upwardly and/or downwardly between collapsed and open positions.

The stroller embodiments described in detail above, are simple, robust, and extremely easy to use. The various structures of stroller 1 may all be made of any suitable plastics, formed of metals, or constructed from any other suitable material.

Although a collapsible stroller has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that this disclosure contemplates that, to the extent possible, one or more features of any embodiment can be combined with one or more features of any other embodiment.

The invention claimed is:

1. A system for generating electrical energy from the movement of a stroller, the system comprising:
   a wheel;
   a gear reduction system operationally coupled between the wheel and a motor such that rotation of the wheel causes the motor to generate electrical energy;
   a power storage device operationally coupled to the motor for storing the electrical energy produced by the motor; and
   a control system comprising:
      a switching device operationally coupled between the motor and the power storage device; and a microcontroller operationally coupled to the switching device and configured to control the state of the switching device, wherein the microcontroller controls the switching device to close to allow the electrical energy generated by the motor to flow into and charge the power storage device, and the microcontroller controls the switching device to open to prevent the electrical energy from flowing to the power storage device.

2. The system of claim 1, wherein the microcontroller controls the switching device by pulsing the switching device open and closed at a predetermined rate and varies a duty cycle.

3. The system of claim 2, wherein the microcontroller varies the duty cycle to allow a greater proportion of the electrical energy generated by the motor to flow to the power storage device and prevent a greater proportion of the electrical energy generated by the motor to flow to the power storage device.

4. The system of claim 2, wherein the microcontroller varies the duty cycle to maximize the proportion of the electrical energy generated by the motor that flows to the power storage device when the stroller is being pushed downhill.

5. The system of claim 4, wherein the microcontroller determines if the stroller is being pushed downhill based on feedback from an accelerometer, a gyroscope, a mercury switch, or any combination thereof.

6. The system of claim 1, wherein the switching device is a transistor.

7. The system of claim 1, wherein the power storage device is a rechargeable nickel metal hydride battery.

8. The system of claim 1, wherein the gear reduction system comprises:
   a first gear operationally coupled to and driven by the wheel;
   a second gear driven by the first gear;
   a third gear driven by the second gear; and
   a fourth gear driven by the third gear,
   wherein the fourth gear is coupled to a drive shaft of the motor such that rotation of the fourth gear causes the motor to produce electrical energy.

9. The system of claim 1, wherein a rubber bushing surrounds at least part of the motor for noise reduction.

10. The system of claim 1, wherein the microcontroller controls the switching device to open to prevent additional electrical energy from flowing to the power storage device if the power storage device is fully charged.

* * * * *